US012743049B2

(12) United States Patent
Yoshida et al.

(10) Patent No.: US 12,743,049 B2
(45) Date of Patent: Sep. 22, 2026

(54) IMAGE FORMING APPARATUS

(71) Applicant: CANON KABUSHIKI KAISHA, Tokyo (JP)

(72) Inventors: Tsuguhiro Yoshida, Kanagawa (JP); Koji An, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/959,463

(22) Filed: Nov. 25, 2024

(65) Prior Publication Data

US 2025/0199470 A1 Jun. 19, 2025

(30) Foreign Application Priority Data

Dec. 13, 2023 (JP) ................................ 2023-210098

(51) Int. Cl.
*G03G 21/20* (2006.01)
*G03G 15/20* (2006.01)

(52) U.S. Cl.
CPC ....... *G03G 21/203* (2013.01); *G03G 15/2017* (2013.01); *G03G 15/2039* (2013.01); *G03G 15/2064* (2013.01); *G03G 21/206* (2013.01)

(58) Field of Classification Search
CPC ........... G03G 15/2017; G03G 15/2039; G03G 15/205; G03G 21/20–206
See application file for complete search history.

(56) References Cited

U.S. PATENT DOCUMENTS

2012/0162343 A1* 6/2012 Fujishiro .................. B41J 2/471 347/225
2014/0023390 A1* 1/2014 Hirado ............... G03G 15/2039 399/70
2014/0210928 A1* 7/2014 Yokoi .............. G03G 15/04054 347/118
2015/0160609 A1* 6/2015 Seong .................. G03G 21/206 399/44
2018/0181039 A1 6/2018 An et al. ................ G03G 15/20
2018/0292782 A1* 10/2018 Nojima .............. G03G 15/2017
2020/0233346 A1 7/2020 Sato et al. ............. G03G 15/20
2020/0233352 A1 7/2020 Doda et al. ............ G03G 15/20
2020/0249600 A1 8/2020 Yoshida et al. ........ G03G 15/20

(Continued)

FOREIGN PATENT DOCUMENTS

JP 2019-124824 7/2019

OTHER PUBLICATIONS

Indian Office Action dated Aug. 11, 2026 in counterpart Indian Patent Appln. No. 202444094639.

*Primary Examiner* — Carla J Therrien
(74) *Attorney, Agent, or Firm* — Venable LLP

(57) ABSTRACT

An image forming apparatus includes a first detector for detecting a temperature of an environment, a fixing unit for fixing a toner image, a second detector for detecting a temperature of the fixing unit and a controller for controlling the fixing unit based on a detecting result of the second detector. The controller performs comparison of a first temperature estimated based on a detecting result of the first detector and a second temperature based on the detecting result of the second detector after completion of a heating operation of the fixing unit and executes a dew condensation removal operation in which a dew condensation in the image forming apparatus is removed in a case in which the second temperature is lower than the first temperature.

6 Claims, 12 Drawing Sheets

(56) References Cited

U.S. PATENT DOCUMENTS

| | | | | |
|---|---|---|---|---|
| 2020/0301330 | A1 | 9/2020 | Yoshida et al. ........ | G03G 15/20 |
| 2020/0322496 | A1 | 10/2020 | Nakama | |
| 2021/0072680 | A1 | 3/2021 | Yoshida et al. ........ | G03G 15/20 |
| 2021/0072684 | A1 | 3/2021 | Doda et al. ............ | G03G 15/20 |
| 2021/0132528 | A1 | 5/2021 | Sato et al. ............. | G03G 15/20 |
| 2021/0165351 | A1 | 6/2021 | Doda et al. ............ | G03G 15/20 |
| 2021/0333732 | A1 | 10/2021 | Yoshida et al. ........ | G03G 15/20 |
| 2021/0333733 | A1 | 10/2021 | Doda et al. ............ | G03G 15/20 |
| 2022/0057736 | A1 | 2/2022 | Doda et al. ............ | G03G 15/20 |
| 2022/0100128 | A1 | 3/2022 | Nakamoto et al. .... | G03G 15/20 |
| 2022/0253006 | A1 | 8/2022 | Doda et al. ............ | G03G 15/20 |
| 2022/0299912 | A1 | 9/2022 | Yoshida et al. ........ | G03G 15/20 |
| 2022/0390882 | A1 | 12/2022 | Doda et al. ............ | G03G 15/20 |
| 2023/0065569 | A1 | 3/2023 | Wakatsu et al. ....... | G03G 15/20 |
| 2023/0067803 | A1 | 3/2023 | Yoshida et al. ........ | G03G 15/20 |
| 2023/0259057 | A1 | 8/2023 | Doda et al. ............ | G03G 15/20 |
| 2023/0400803 | A1 | 12/2023 | Doda et al. ............ | G03G 15/20 |
| 2024/0069476 | A1 | 2/2024 | Yokota et al. ......... | G03G 15/20 |
| 2024/0201623 | A1 | 6/2024 | Wakatsu et al. ....... | G03G 15/20 |
| 2024/0272571 | A1 | 8/2024 | Yoshida et al. ........ | G03G 15/20 |
| 2024/0288807 | A1 | 8/2024 | Wakatsu et al. ....... | G03G 15/20 |

* cited by examiner (a) EMBODIMENT 1

| PAGE | 1 | 2 | 3 | 4 | 5 | 6 | 7 | 8 | 9 | 10 |
|---|---|---|---|---|---|---|---|---|---|---|
| THIN DENSITY | ○ | ○ | ○ | ○ | ○ | ○ | ○ | ○ | ○ | ○ |
| PAGE | 11 | 12 | 13 | 14 | 15 | 16 | 17 | 18 | 19 | 20 |
| THIN DENSITY | ○ | ○ | ○ | ○ | ○ | ○ | ○ | ○ | ○ | ○ |
| PAGE | 21 | 22 | 23 | 24 | 25 | 26 | 27 | 28 | 29 | 30 |
| THIN DENSITY | ○ | ○ | ○ | ○ | ○ | ○ | ○ | ○ | ○ | ○ |

(b) COMPARATIVE EXAMPLE

| PAGE | 1 | 2 | 3 | 4 | 5 | 6 | 7 | 8 | 9 | 10 |
|---|---|---|---|---|---|---|---|---|---|---|
| THIN DENSITY | ○ | ○ | ○ | ○ | ○ | ○ | ○ | ○ | ○ | ○ |
| PAGE | 11 | 12 | 13 | 14 | 15 | 16 | 17 | 18 | 19 | 20 |
| THIN DENSITY | ○ | ○ | ○ | ○ | ○ | ○ | ○ | × | × | × |
| PAGE | 21 | 22 | 23 | 24 | 25 | 26 | 27 | 28 | 29 | 30 |
| THIN DENSITY | ○ | ○ | ○ | × | × | × | × | × | × | × |

FIG. 8

IMAGE FORMING APPARATUS

FIELD OF THE INVENTION AND RELATED ART

The present invention relates to an image forming apparatus such as an electrophotographic printer and an electrophotographic copier which form an image on a recording material.

In the image forming apparatus, after transferring a toner image which is formed on a photosensitive drum onto a recording material, the toner image is fixed to the recording material by a fixing device which is one of examples of image heating devices. In a case that a dew condensation is generated in those image forming apparatuses, deterioration in image quality such as a change in image density may occur. Japanese Laid-Open Patent Application (JP-A) 2019-124824 discloses a configuration which predicts generation of a dew condensation inside an image forming apparatus and reduces degradation of image quality by using a temperature and humidity detecting element which detects temperature and humidity in a setting environment of the image forming apparatus and a temperature detecting element which detects temperature inside the image forming apparatus.

SUMMARY OF THE INVENTION

The present invention provides a means of suppressing an occurrence of an image defect due to a dew condensation generated by moisture which is caused through a fixing process.

That is an image forming apparatus for forming an image on a recording material, the image forming apparatus comprising: a first detecting unit configured to detect a temperature of an environment where the image forming apparatus in installed; a fixing unit configured to fix a toner image formed on the recording material by heating and pressurizing; a second detecting unit configured to detect a temperature of the fixing unit; and a control unit configured to control the fixing unit based on a detecting result of the second detecting unit, wherein the control unit performs comparison of a first temperature estimated based on a detecting result of the first detecting unit and a second temperature based on the detecting result of the second detecting unit after completion of a heating operation of the fixing unit and executes a dew condensation removal operation in which a dew condensation in the image forming apparatus is removed in a case in which the second temperature is lower than the first temperature.

According to the present invention, it is possible to suppress an occurrence of an image defect due to a dew condensation generated by moisture which is caused through a fixing process.

Further features of the present invention will become apparent from the following description of exemplary embodiments with reference to the attached drawings.

Figure 4:
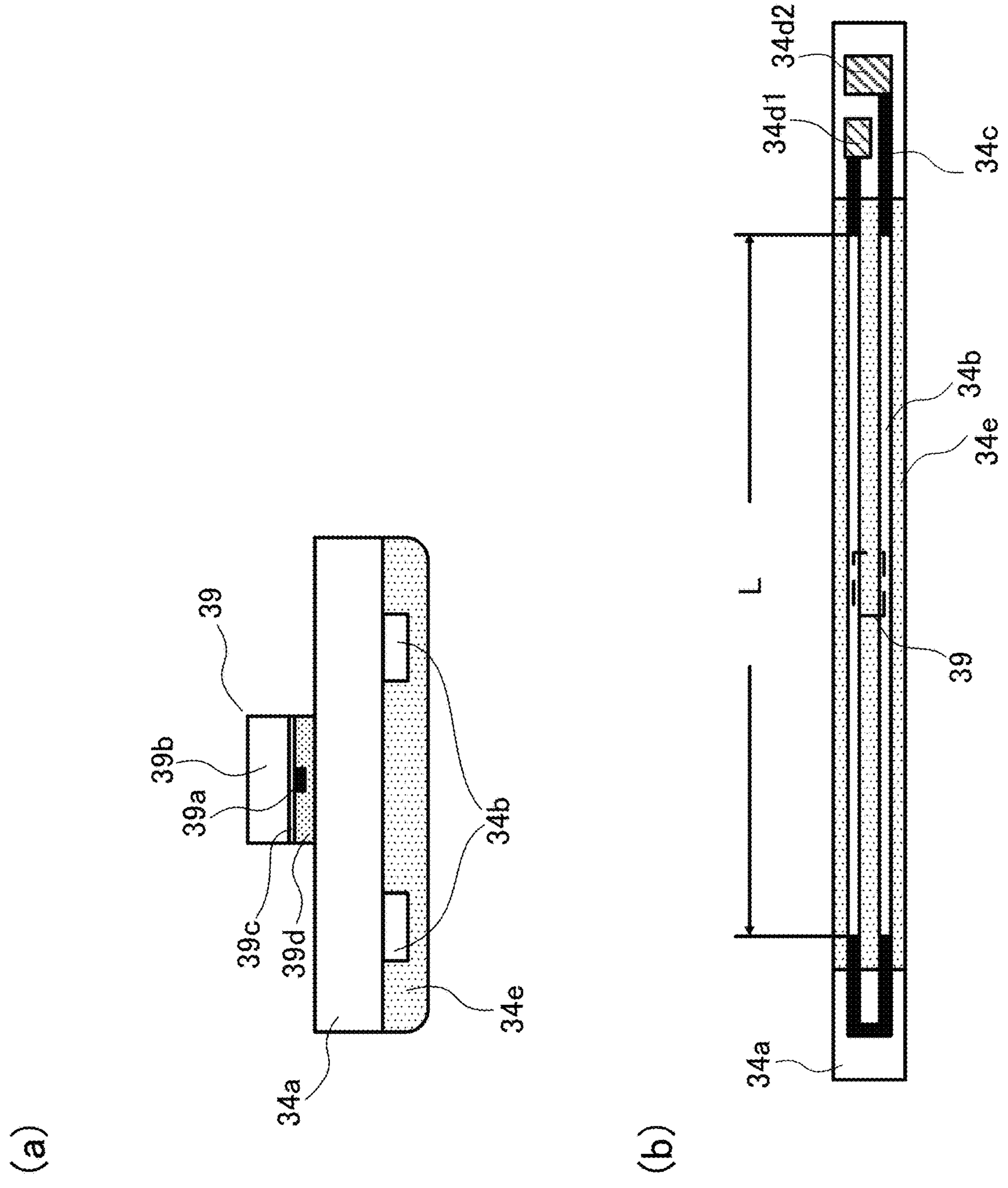

Part (a) and part (b) of FIG. 4 are schematic views of a heater according to the first embodiment.

Figure 5:
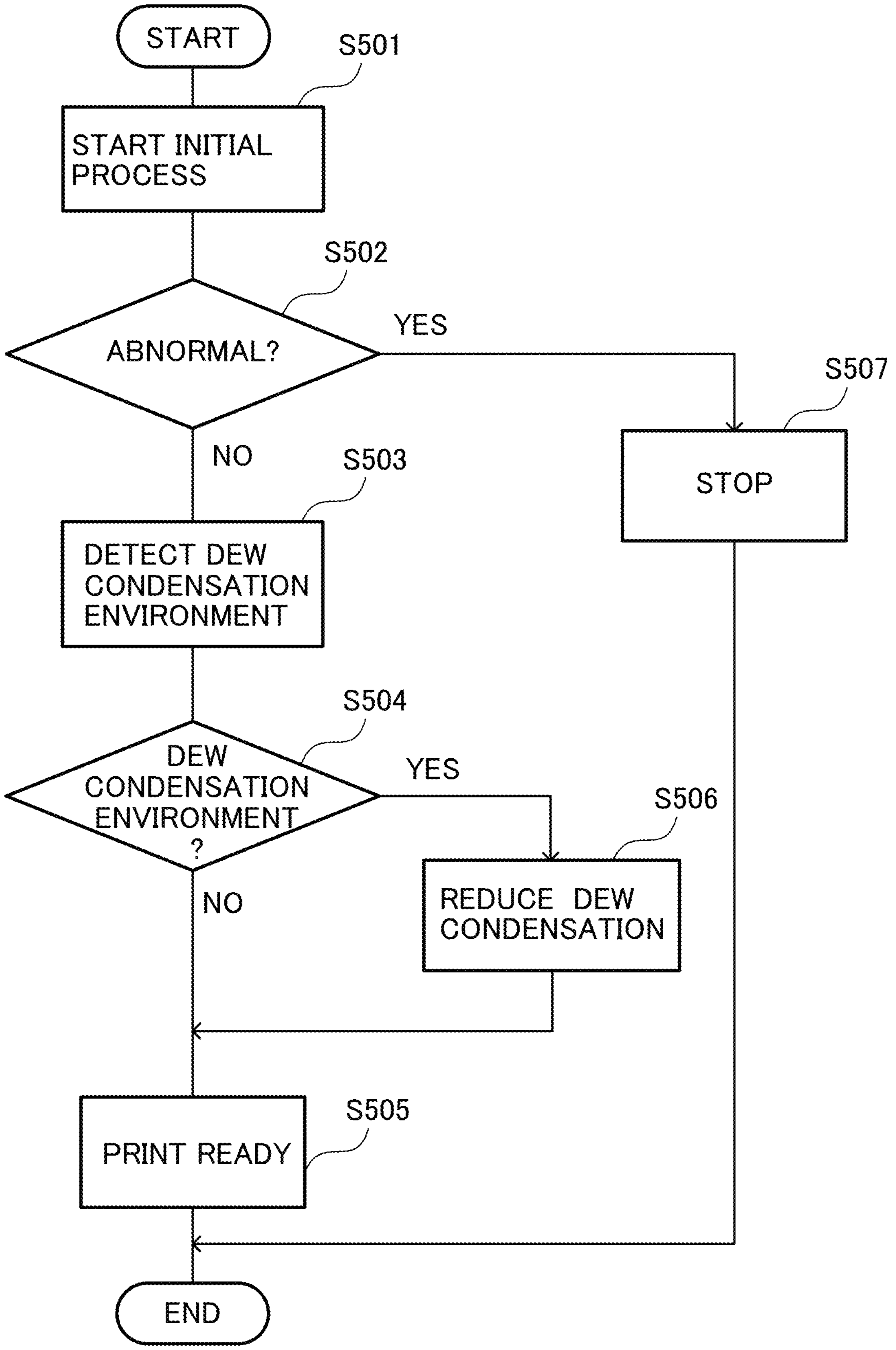

FIG. 5 is a flowchart for a dew condensation environment detection operation according to the first embodiment.

Figure 6:
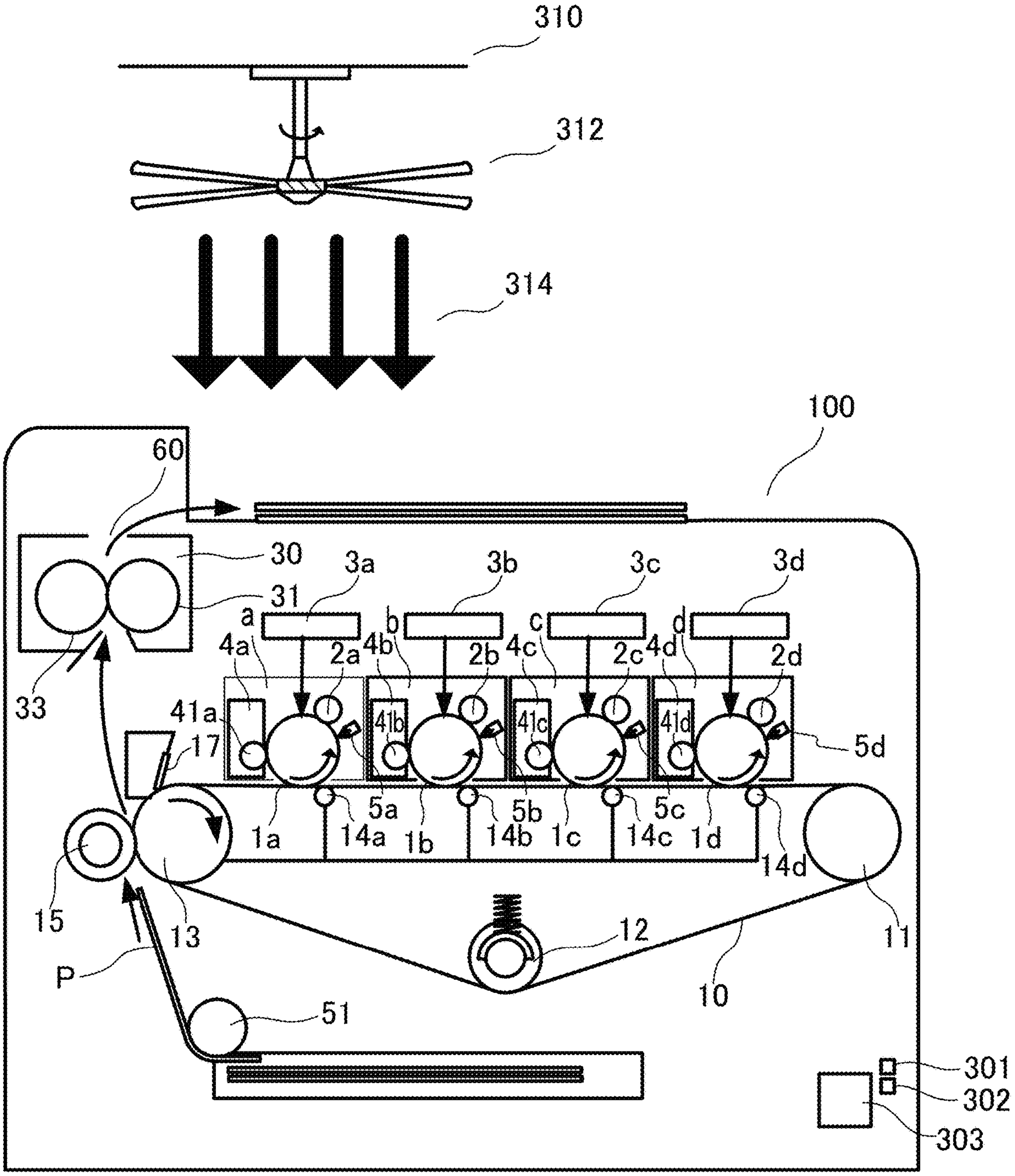

FIG. 6 is a view illustrating a setting environment in a verification according to the first embodiment.

Figure 7:
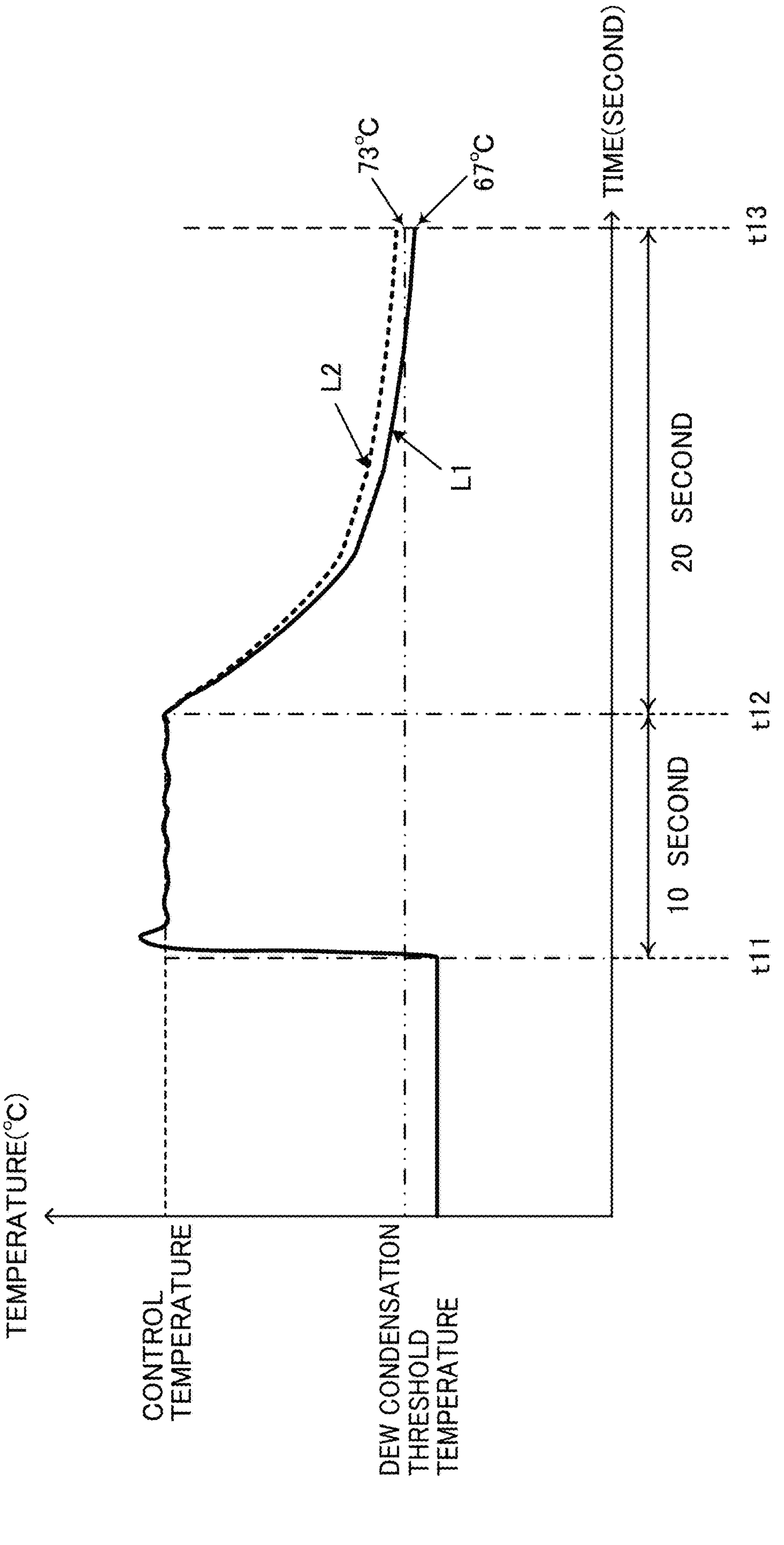

FIG. 7 is a graph illustrating the dew condensation environment detection operation according to the first embodiment.

Part (a) and part (b) of FIG. 8 are tables illustrating an effect in the first embodiment.

Figure 9:
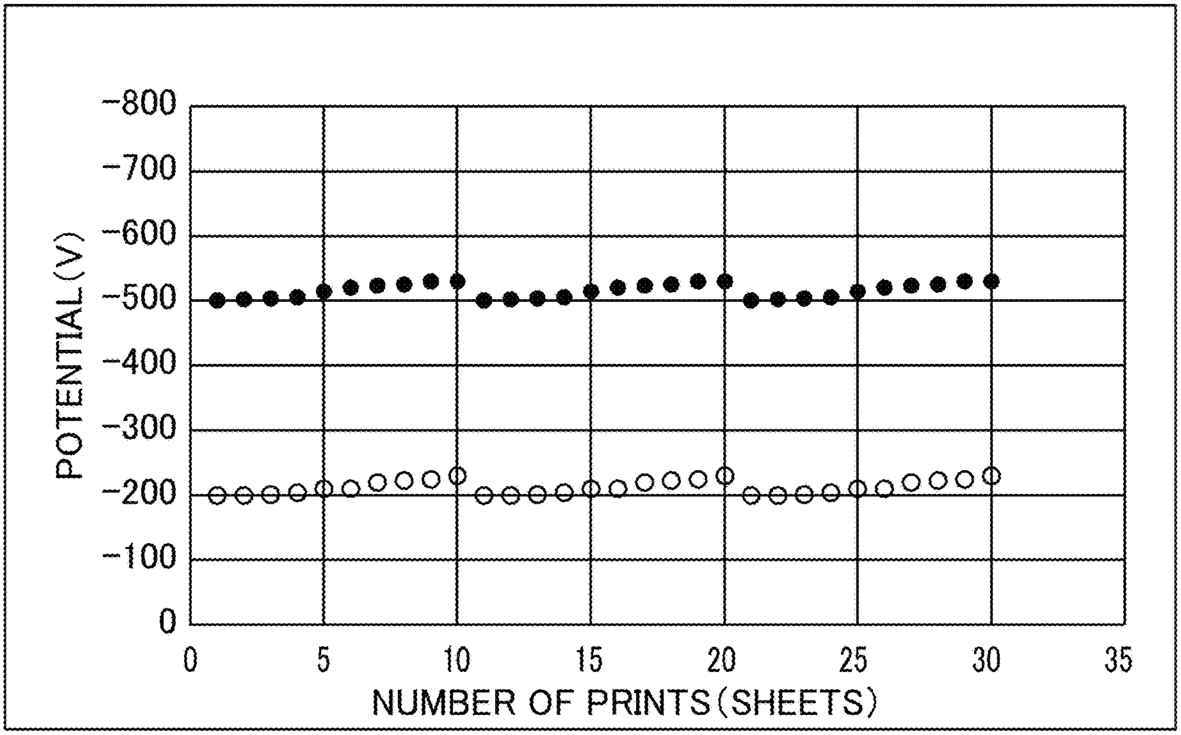
Figure 9:
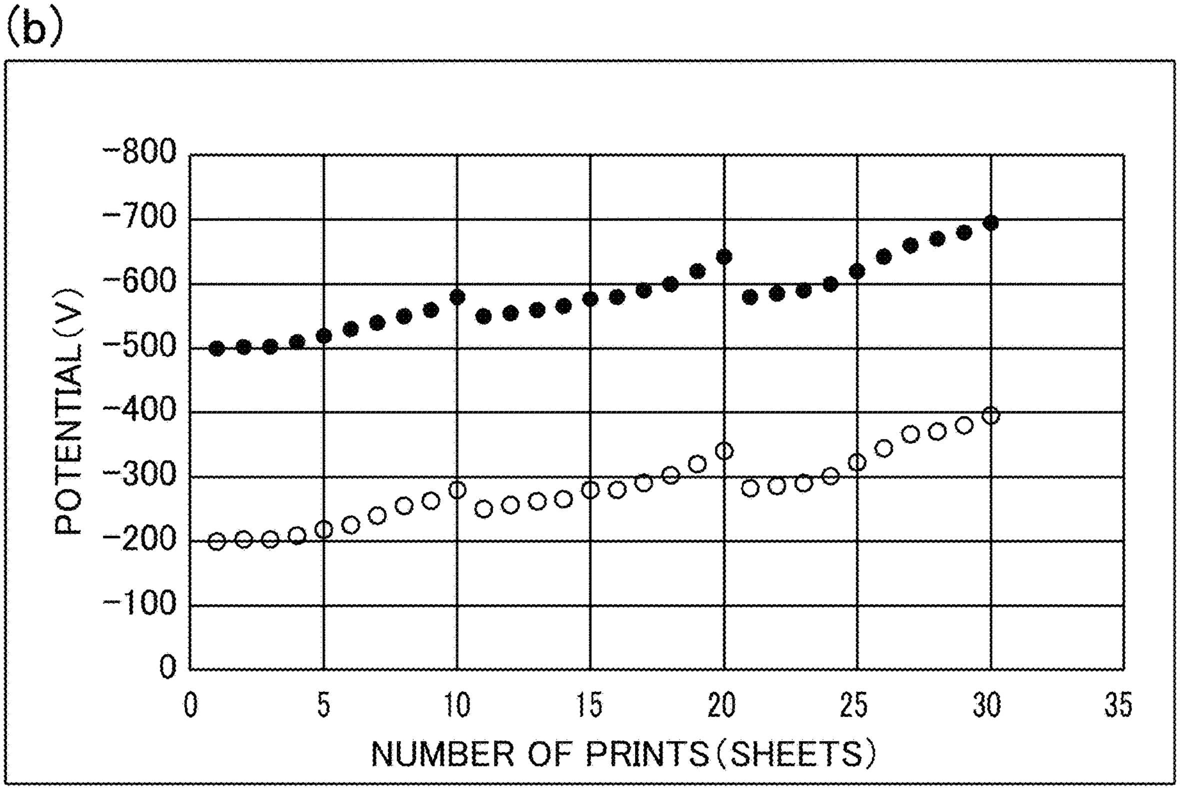
Figure 10:
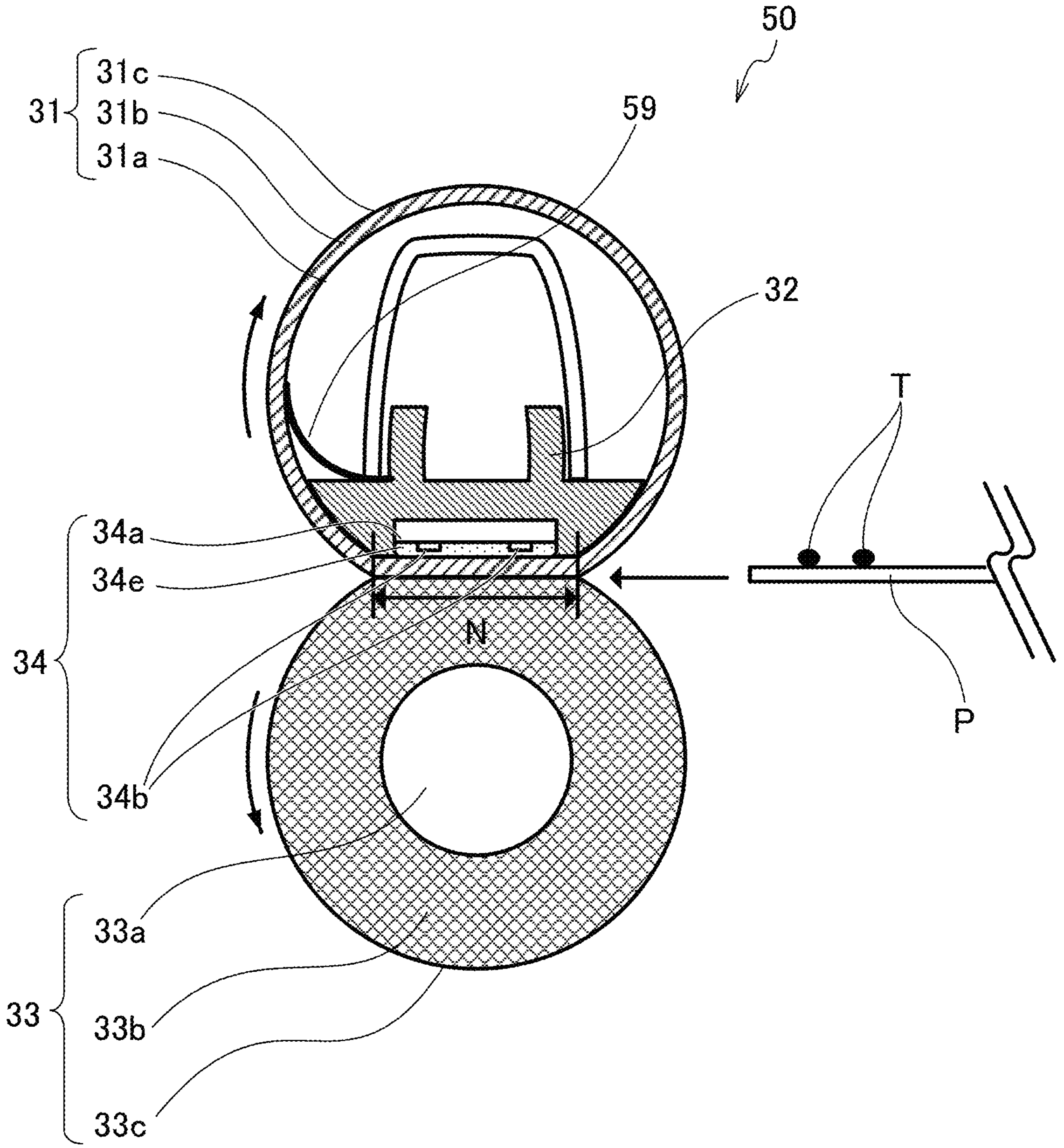

Part (a) and part (b) of FIG. 9 are graphs illustrating a mechanism of occurring a thin density in the verification according to the first embodiment FIG. 10 is a schematic sectional view of a fixing device according to a second embodiment.

Figure 11:
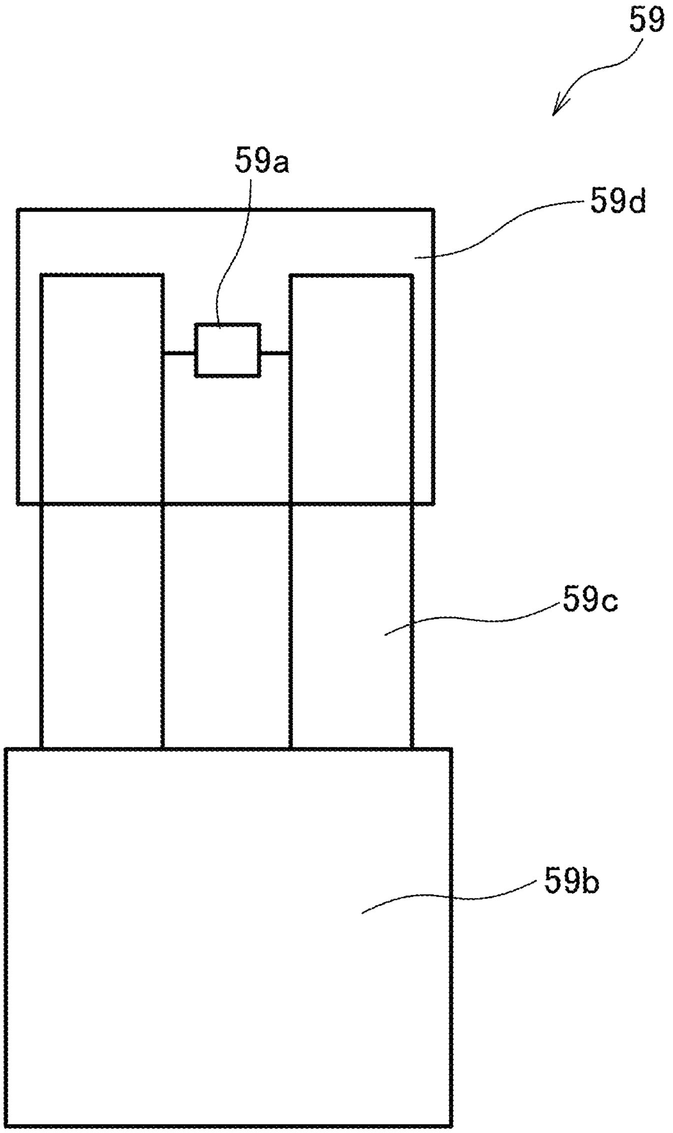

FIG. 11 is a schematic diagram of a fixing temperature sensor according to the second embodiment.

Figure 12:
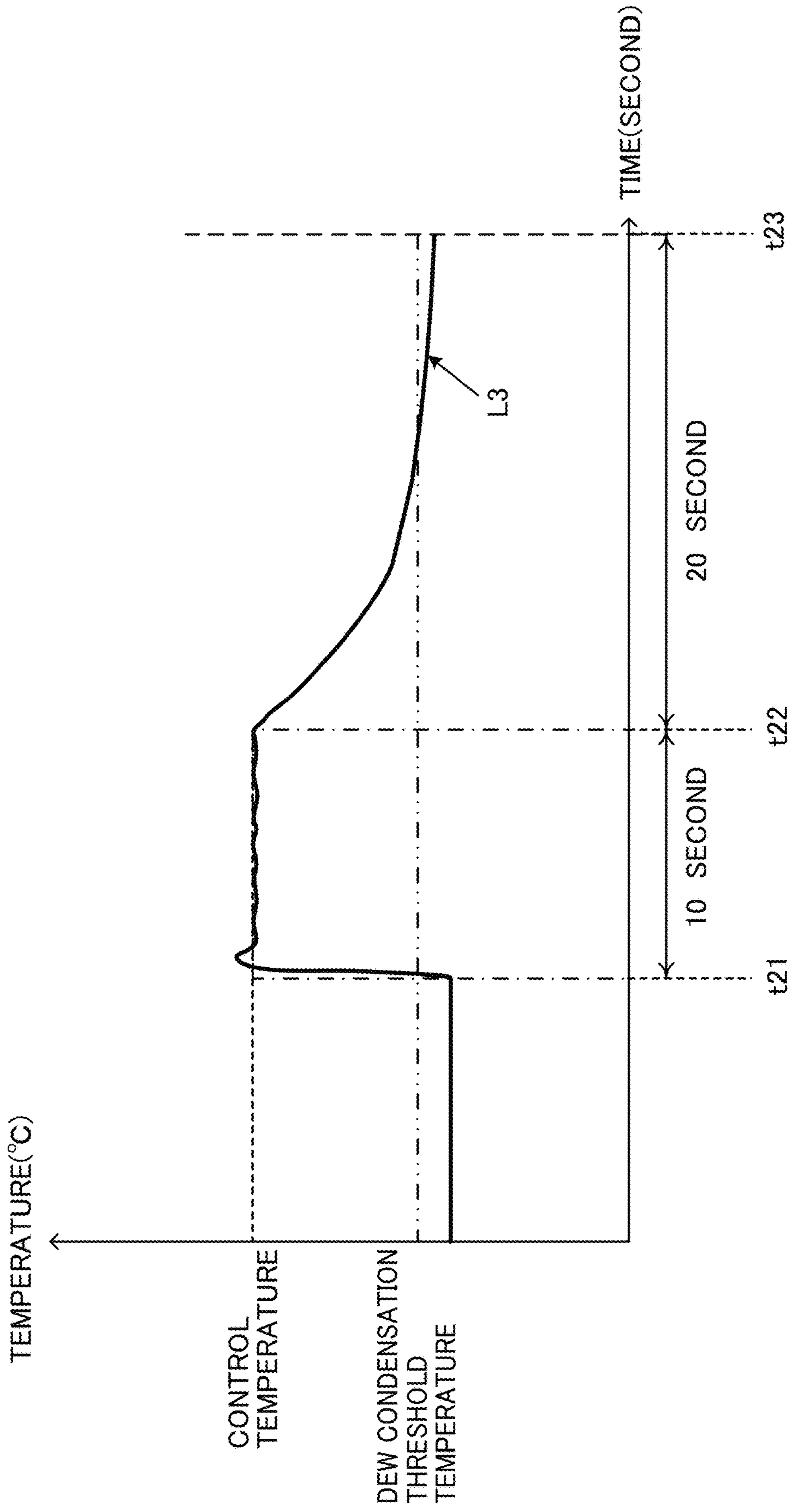

FIG. 12 is a graph illustrating the dew condensation environment detection operation according to the second embodiment.

DESCRIPTION OF THE EMBODIMENTS

In the following, suitable embodiments of the present invention will be described exemplary in detail with reference to figures. However, dimensions, materials, shapes, relative arrangements, etc. of component parts which are described in embodiments below should be changed as appropriate depending on configurations and various conditions of an apparatus to which the present invention is applied. Therefore, as far as it is not specifically described, it is not intended to limit a scope of the present invention only to them.

First Embodiment

Image Forming Apparatus

Figure 1:
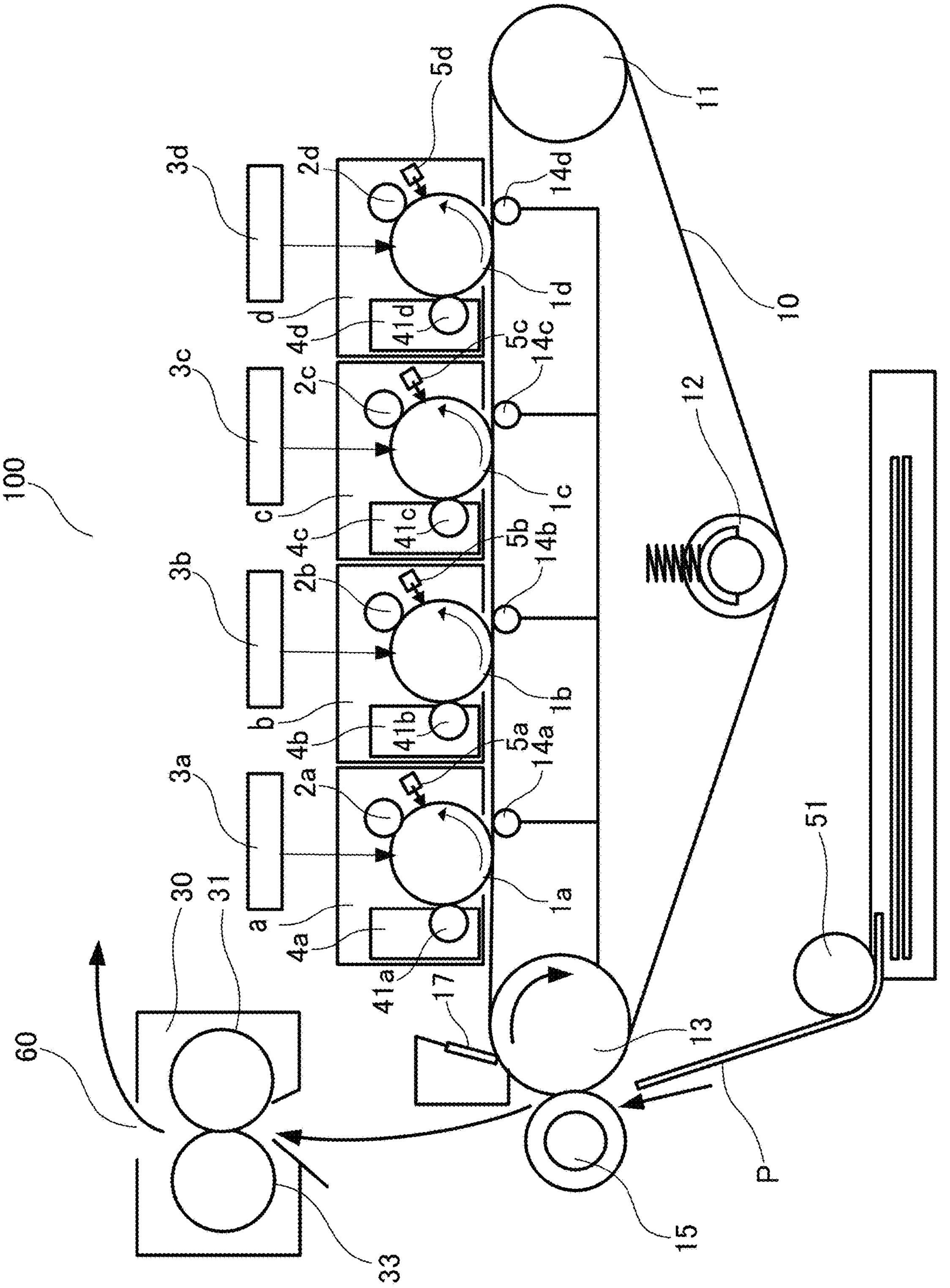
FIG. 1 is a view showing an overview of an image forming apparatus according to a first embodiment and a second embodiment.

FIG. 1 is a schematic diagram of one of examples of a color image forming apparatus, and a configuration and an operation of the image forming apparatus 100 according to a first embodiment will be described by using FIG. 1. Incidentally, the image forming apparatus 100 according to the first embodiment is a so-called tandem type printer with which image forming stations a to d are provided. A first image forming station a forms an image of yellow (Y), a second image forming station b forms an image of magenta (M), a third image forming station c forms an image of cyan (C) and a fourth image forming station d forms an image of black (K). A configuration of each image forming station is same except for color of toner which is accommodated, and in the following the first image forming station a will be described. Further, in the following, in a case that distinction is not especially required, from a to d in Y, M, C and K will be omitted and it will be described.

The first image forming station a is provided with a photosensitive drum 1*a*, a charging roller 2*a* as a charging means, an exposure unit 3*a* and a developing unit a. The photosensitive drum 1*a* is an image bearing member which is rotationally driven by a photosensitive drum driving portion 110 (see FIG. 2) at a peripheral speed (process speed) of 150 mm/sec in a direction of an arrow and bears a toner image. The photosensitive drum 1*a* is provided with a photosensitive layer and a surface layer on an aluminum tube whose diameter is 20 mm, and a thin film layer, which is made of polyacrylate and whose film thickness is 20 μm, is used for the surface layer.

When a control portion 200 (see FIG. 2) as a control means such as a controller receives an image signal, an image forming operation is started and the photosensitive drum 1*a* is rotationally driven. In a process of rotation, the photosensitive drum 1*a* is uniformly charged to a predetermined potential with a predetermined polarity (a normal polarity is negative in the first embodiment) by the charging roller 2*a* and exposed according to the image signal by the exposure unit 3*a* as an exposure means which includes a light source. In this way, an electrostatic latent image corresponding to a yellow color component image of an intended color image is formed on the photosensitive drum 1*a*. Subsequently, the electrostatic latent image is developed by a developing device 4*a* (yellow developing device) at a developing position and visualized as a yellow toner image on the photosensitive drum 1*a*.

The charging roller 2*a* as a charging member contacts a surface of the photosensitive drum 1*a* in a charging portion at a predetermined pressure contact force and is rotationally driven against the photosensitive drum 1*a* by a friction with the surface of the photosensitive drum 1*a*. Further, a predetermined DC voltage is applied to a rotating shaft of the charging roller 2*a* from a charging voltage power source 120 (see FIG. 2) according to the image forming operation. In the first embodiment, the charging roller 2*a* includes an elastic layer which is consisting of a conductive elastic material with a thickness of 1.5 mm and a volume resistivity of approximately $1\times10^{6}$ Ωcm on a metal shaft with a diameter of 5.5 mm. And in accordance with the image forming operation, the control portion 200 applies a DC voltage of −1050V as a charging voltage to the rotating shaft of the charging roller 2*a* and charges the surface of the photosensitive drum 1*a* to a predetermined potential of −500V. Surface potential of the photosensitive drum 1*a* is measured with a surface potential meter Model 344 which is made by Trek. The surface potential of the photosensitive drum 1*a* which is −500V at this time is a surface potential of the photosensitive drum 1 during non-image formation and is a dark potential (Vd) in which the toner image is not developed.

Figure 2:
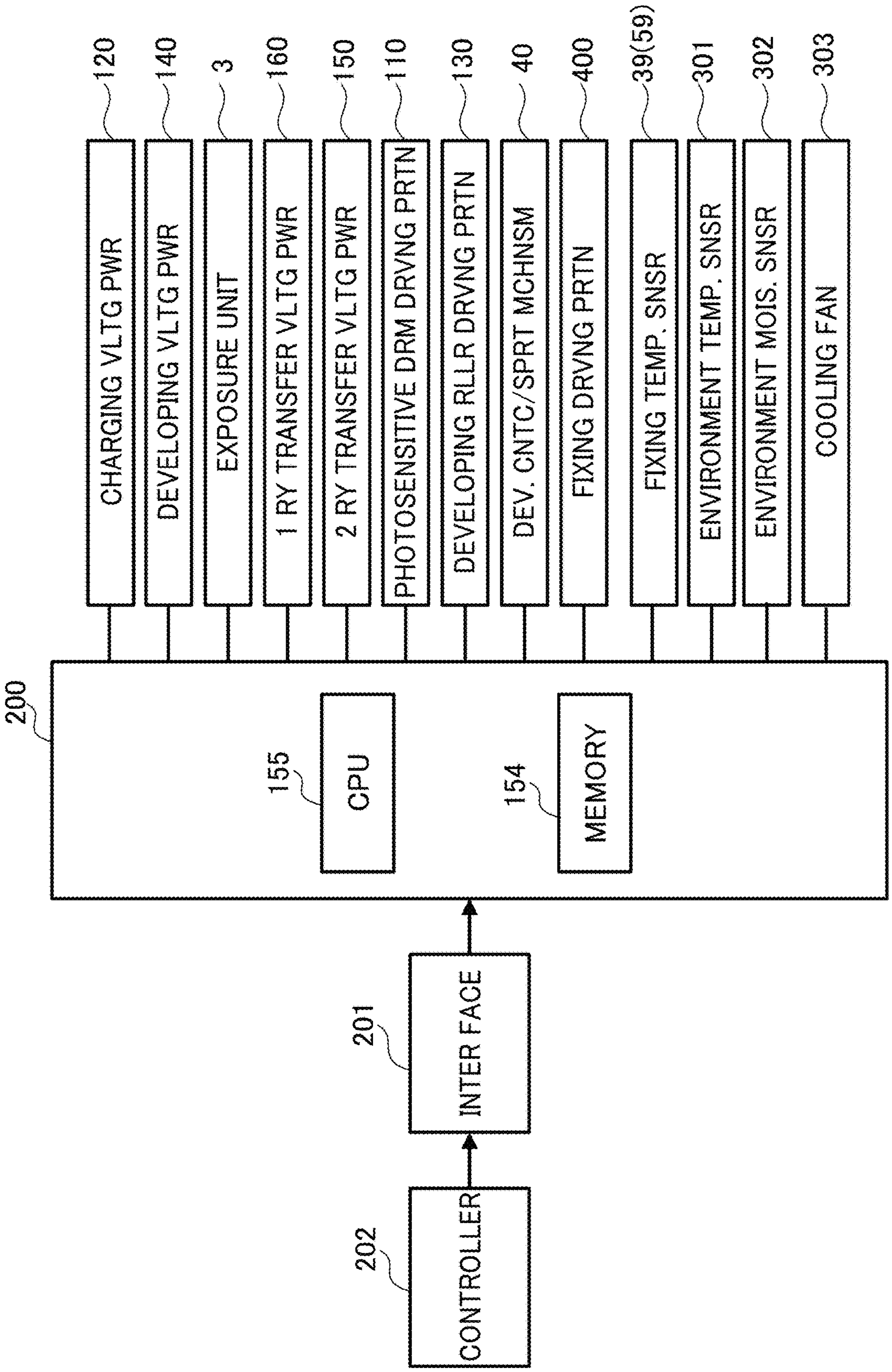
FIG. 2 is a control block diagram according to the first embodiment and the second embodiment.

The exposure unit 3*a* is provided with a laser driver, a laser diode (light source), a rotational polygon mirror, an optical lens system, etc. As shown in FIG. 2, the exposure unit 3 is input from the controller 202 to the control portion 200 via interface 201, and a time series electrical digital pixel signal of an image information in which image is processed is input. In the first embodiment, an exposure amount (light intensity) is adjusted so that an image forming potential VI of the photosensitive drum 1*a* in an electrostatic latent image portion after exposure by the exposure unit 3*a* is −100V. The image forming potential is also referred to as a light portion potential.

The developing unit 4*a* is provided with a developing roller 41*a* as a developing means (developing member) (developer carrying member) and toner as a single component developer. The developing unit 4*a* is a developing means which performs a developing action on the photosensitive drum 1*a* in order to develop the electrostatic latent image as a toner image, and is a developer accommodating portion which contains developer. The developing unit 4*a* and a main body of the image forming apparatus 100 are provided with a developing contacting/spacing mechanism 40 which controls a state of contacting/spacing (developing spacing) between the developing roller 41*a* and the photosensitive drum 1*a*, as shown in FIG. 2. The control portion 200 performs contacting and spacing between the developing roller 41*a* and the photosensitive drum 1*a* according to image forming operation, etc. When the developing roller 41*a* and the photosensitive drum 1*a* are contacted, the developing roller 41*a* contacts the photosensitive drum 1*a* with a pressing force of 1.96N. Regarding widths of a developing nip portion which is a contacting portion between the developing roller 41*a* and the photosensitive drum 1*a*, a width in the rotational direction of the photosensitive drum 1*a* is 2 mm and a width in a longitudinal direction (direction of rotational axis) of the photosensitive drum 1*a* is 220 mm. And the developing roller 41*a* is rotationally driven by a developing roller driving portion 130 at a peripheral speed which is faster than that of the photosensitive drum 1*a*, so that a direction of surface movement of the developing roller 41*a* is in the same direction as that of the photosensitive drum 1*a* at an opposing portion (contact portion) to the photosensitive drum 1*a*.

A pre-exposure unit 5*a* as a charge eliminating means eliminates charge from the surface of photosensitive drum 1*a* by exposing the surface of the photosensitive drum 1*a* before the surface of the photosensitive drum 1*a* is charged by the charging roller 2*a*. By eliminating charge from the surface of the photosensitive drum 1*a*, it serves to equalize surface potential which is formed on the photosensitive drum 1*a* and to control the amount of discharge by an electric discharge which occurs in the charging portion.

Further, the control portion 200 controls so as to apply a DC voltage of −300V as a developing voltage Vdc from a developing voltage power source 140 to a core metal of the developing roller 41*a* when the developing roller 41*a* contacts the photosensitive drum 1*a* during image forming operation. During image formation, toner which is borne on the developing roller 41*a* is developed on an image forming potential VI portion on the photosensitive drum 1*a* by an electrostatic force which is generated by potential difference between the developing voltage Vdc=−300V and the image forming potential on the photosensitive drum 1*a* VI=−100V.

Here, in a following description, with respect to potential and applied voltage, a greater absolute value on a negative polarity side (for example, −1000V compared to −500V) is referred to as a high potential, and a smaller absolute value on the negative polarity side (for example, −300V compared to −500V) is referred to as a low potential. This is because the toner with negative charge according to the first embodiment is considered as a standard. Further, a voltage according to the first embodiment is expressed as a potential difference from the ground potential (0V). Therefore, the developing voltage Vdc=−300V is regarded as a potential difference is −300V due to the developing voltage which is applied to the core metal of the developing roller 41*a* with respect to the ground potential. This is also true with respect to charging voltage, transfer voltage, etc.

Voltage which is output by each power source is adjusted accordingly based on values of an environmental temperature sensor 301 and an environmental humidity sensor 302 as a first detecting means. The image forming apparatus 100 is provided with a cooling fan 303 to cool heat which is generated by power sources and motors and heat which is generated by rotational driving of components. Temperature rise is suppressed when the cooling fan 303 sucks an outside air and blows it to each of heat generating portions. The cooling fan 303 corresponds to a cooling component which sucks the outside air and cools the fixing device 30. It is desirable that the environmental temperature sensor 301 is mounted in a location in which it is least affected by increased temperature which is caused by various power sources in the image forming apparatus 100 and the fixing device 30. In the first embodiment 1, the environmental temperature sensor 301 is arranged at an intake port of the cooling fan 303 which sucks the outside air (see FIG. 6). The cooling fan 303 starts driving when the power source is turned on and continues driving during the operation of the image forming apparatus 100. The cooling fan 303 stops when the image forming operation is completed and the image forming apparatus 100 changes to a sleep state. In the first embodiment, it will take 5 seconds for the image forming apparatus 100 to change to the sleep state after completion of the image forming operation. Incidentally, the sleep state is a state in which the image forming apparatus 100 reduces power consumption in order to achieve power savings. For example, in the sleep state, the power supply to the fixing device 30 and the rotational driving of each rotating member is stopped, and minimum functions, such as the control portion 200 which is necessary to receive a next image forming instruction and return to a print state, are in operation.

Subsequently, the control portion 200 will be described. FIG. 2 is a control block diagram showing a schematic control mode of main portions of the image forming apparatus 100 according to the first embodiment. The controller 202 transfers various electrical information with a host device and controls the image forming operation of the image forming apparatus 100 with the control portion 200 via the interface 201 according to a predetermined control program and a reference table. The control portion 200 is configured to include a CPU 155 which performs various arithmetic operations, a memory 154 such as ROM and RAM which are memory elements, etc. The RAM stores sensor detection results, counter count results, arithmetic results, etc., while the ROM stores control programs, data tables which is obtained through experiments, etc., in advance, etc. Each controlled object, sensor, counter, etc. in the image forming apparatus 100 is connected to the control portion 200. The control portion 200 controls the transfer of various electrical information signals and the timing of driving of each portion, etc. and performs control of a predetermined image forming sequence, etc. For example, the control portion 200 controls voltage and exposure amount which are applied by the charging voltage power source 120, the developing voltage power source 140, the exposure unit 3, a primary transfer voltage power source 160 and the secondary transfer voltage power source 150. In addition, the control portion 200 also controls the photosensitive drum driving portion 110, the developing roller driving portion 130, the developing contacting/spacing mechanism 40 and a fixing driving portion 400. And the image forming apparatus 100 performs image forming on a recording material P (on a recording material) based on an electrical image signal which is input to the controller 202 from the host device. Incidentally, the host devices include image readers, personal computers, fax machines, smart phones, etc.

The toner according to the first embodiment is non-magnetic toner with negative charge which is produced by a suspension polymerization method, its volume average particle diameter is 7.0 μm, and it is negatively charged when it is borne on the developing roller 41*a*. Volume average particle diameter of toner is measured by a laser diffraction type particle size distribution meter LS-230 which is manufactured by Beckman Coulter.

An intermediary transfer belt 10 as an intermediary transfer member in FIG. 1 is stretched with a plurality of stretching members 11, 12, and 13. The stretching member 13 is driven by an unshown motor at a peripheral speed of 103% with respect to the photosensitive drum 1*a* in a direction which moves in a peripheral direction at an opposing portion which contacts the photosensitive drum 1*a*. The stretching member 11 and the stretching member 12 are rotationally driven while it is driven by rotation of the intermediary transfer belt 10. DC voltage of 250V is applied to the primary transfer roller 14*a* as the primary transfer member from the primary transfer voltage power source 160 at a time of the primary transfer during image forming operation. In the first embodiment, it is configured that DC voltage is also applied to the stretching member 13 from the primary transfer voltage power source 160. It may also be configured that DC voltage is also applied to the stretching member 11 and the stretching member 12 from the primary transfer voltage power source 160. A yellow toner image which is formed on the photosensitive drum 1*a* is electrostatically transferred onto the intermediary transfer belt 10 during a process of passing through a primary transfer portion which is a contacting portion of the photosensitive drum 1*a* and the primary transfer roller 14*a* via the intermediary transfer belt 10. In the first embodiment, difference in peripheral speed is set between the photosensitive drum 1*a* and the intermediary transfer belt 10. In this way, the toner is moved on the photosensitive drum 1*a* in the primary transfer portion and adhesion force is reduced, thereby, primary transfer efficiency is improved. Here, it is configured that developer which is remained on the photosensitive drum 1*a* without being transferred to the intermediary transfer belt 10 is collected by the developing roller 41*a*.

The primary transfer roller 14*a* is a metal roller which is cylindrical shape with a diameter of 6 mm and is made of nickel plated steel. The primary transfer roller 14*a* is arranged at a position which is offset by 8 mm from a center position of the photosensitive drum 1*a* in a downstream side with respect to a moving direction of the intermediary transfer belt 10, and the intermediary transfer belt 10 is configured to be wound around the photosensitive drum 1*a*. In the plurality of photosensitive drums 1 and plurality of primary transfer rollers 14, they are arranged so that distance from an axial center of each photosensitive drum 1 to an axial center of each primary transfer roller 14 is equal. An amount of offset may be changed for each image forming station. The primary transfer roller 14*a* is arranged at a position 1 mm lifted from a horizontal plane which is formed by the photosensitive drum 1*a* and the intermediary transfer belt 10, so that winding amount of the intermediary transfer belt 10 around the photosensitive drum 1*a* is secured. And the primary transfer roller 14*a* presses the intermediary transfer belt 10 with force of approximately 1.96 N. The primary transfer roller 14*a* rotates and is driven in accordance with rotation of the intermediary transfer belt 10. Further, the primary transfer roller 14*b* which is arranged in a second image forming station b, the primary transfer roller 14*c* which is arranged in a third image forming station c, and the primary transfer roller 14*d* which is arranged in a fourth image forming station d are also configured similar to the primary transfer roller 14*a*.

In the following, similarly, a second color magenta toner image, a third color cyan toner image and a fourth color black toner image are formed by a second, a third and a fourth image forming stations b, c and d, respectively, and are sequentially transferred over the intermediary transfer belt 10. And a composite color image corresponding to an intended color image is obtained on the intermediary transfer belt 10.

Four-color toner images on the intermediary transfer belt 10 are transferred all at once to the surface of the recording material P which is fed by a sheet feeding roller 51 as a sheet feeding means during a secondary transfer process when passing through a secondary transfer nip portion which is formed by the intermediary transfer belt 10 and a secondary transfer roller 15 as a secondary transfer member. The secondary transfer roller 15 contacts the intermediary transfer belt 10 with pressure force of 50N and forms the secondary transfer nip portion. The secondary transfer roller 15 is rotationally driven to the intermediary transfer belt 10, and, further, when the toner on the intermediary transfer belt 10 is being secondarily transferred to the recording material P such as paper, a voltage of 1500V is applied from the secondary transfer voltage power source 150.

After that, the recording material P which bears the four-color toner image is introduced into the fixing device 30. The four-color toner is heated and pressed by the fixing device 30 and it is melted and mixed and fixed to the recording material P. A configuration of the fixing device 30 and details of its operation will be described below. The toner which is remained on the intermediary transfer belt 10 after the secondary transfer is cleaned and removed by the cleaning device 17. The cleaning device 17 includes a cleaning blade, etc. which contacts an outer peripheral surface of the intermediary transfer belt 10, scrapes off the toner which remains on the intermediary transfer belt 10 and collects it in the cleaning device 17. The cleaning device 17 is arranged on a downstream side from the secondary transfer portion of the intermediary transfer belt 10 with respect to the rotational direction of the intermediary transfer belt 10 so that the toner which is adhered on the intermediary transfer belt 10 is collected. By the above operation, a full-color printed image is formed.

Configuration of the intermediary Transfer Belt

The intermediary transfer belt 10 is 700 mm in a circumference and 92 μm in a thickness and is formed of a base layer (first layer) and a surface layer (second layer). The base layer is made of endless polyvinylidene fluoride (PVdF) mixed with ionic conductors such as a polyvalent metal salt and a quaternary ammonium salt as a conductive agent. For the surface layer, an acrylic resin which is mixed with metal oxide, etc. as a conductive agent. In a case that thickness of the base layer is defined as t1 and thickness of the surface layer is defined as t2, t1=87 μm and t2=2 μm.

Fixing Device

Figure 3:
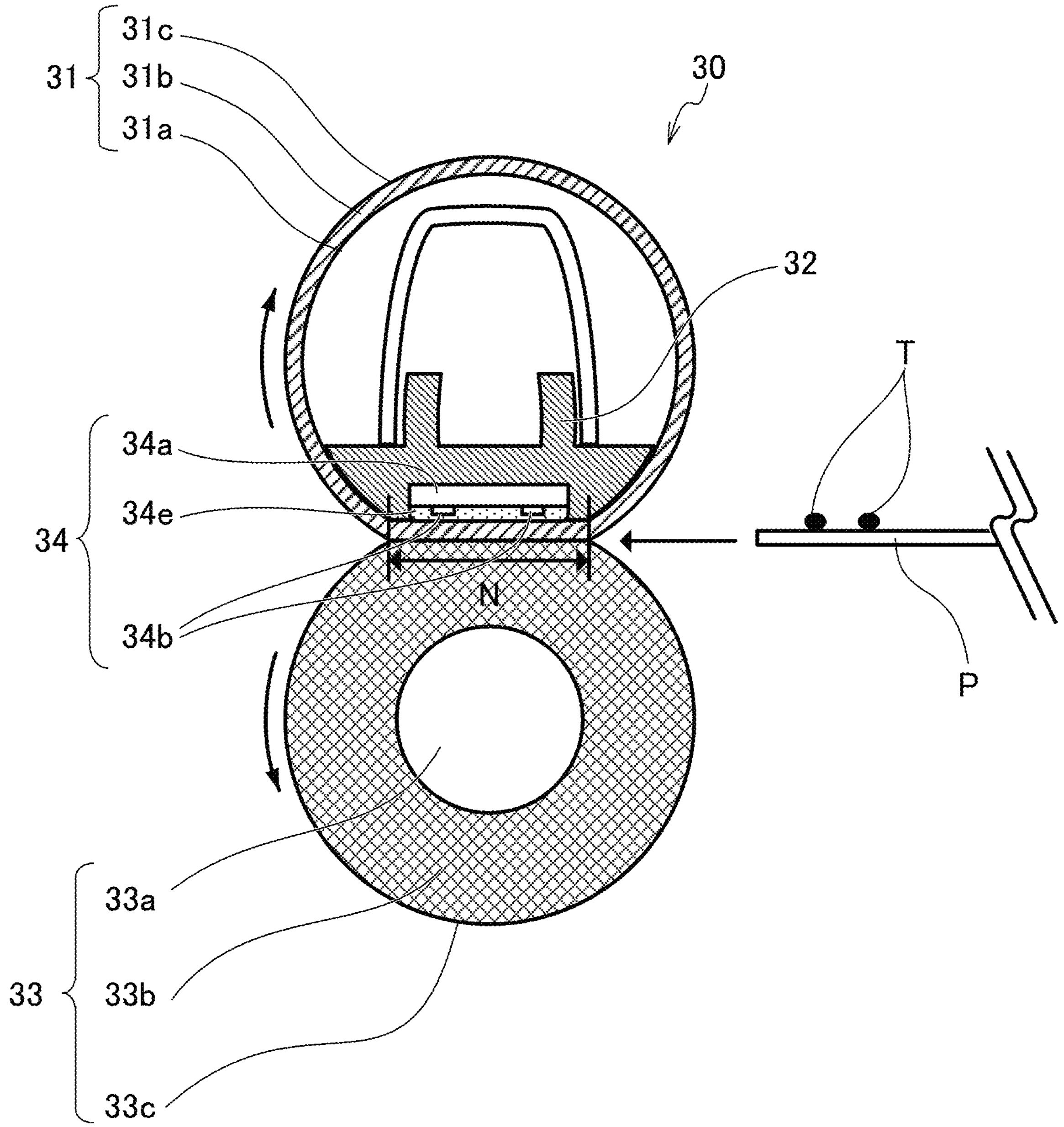
FIG. 3 is a schematic sectional view of a fixing device according to the first embodiment.

Next, a configuration of the fixing device 30 according to the first embodiment will be described by using FIG. 3. Here, a longitudinal direction is defined as a direction of a rotational axis of a pressing roller 33, which is substantially perpendicular to a conveying direction of the recording material P, as will be described below. Further, a length of the recording material P in a direction which is substantially perpendicular to a conveying direction (longitudinal direction) is defined as a width. FIG. 3 is a sectional schematic view of the fixing device 30. Further, part (a) of FIG. 4 is a sectional schematic view of the heater. Further, part (a) of FIG. 4 is a sectional view of a heating member 34*b* at a center with respect to the longitudinal direction which corresponds to a center of the recording material P which is conveyed in the fixing device 30 with respect to the longitudinal direction.

From right side of FIG. 3, the recording material P which holds an unfixed toner image T is heated while being conveyed from right to left in a fixing nip portion N, thereby, the toner image T on the recording material P is fixed. The fixing device 30 according to the first embodiment is configured of a cylindrical film 31, a nip forming member 32 which holds the film 31, a pressing roller 33 which forms the fixing nip portion N with the film 31 and a heater 34 for heating the recording material P.

The film 31 which is a first rotator is a fixing film as a heating rotator. In the first embodiment, polyimide, for example, is used as the base layer 31*a*. An inner diameter of the base layer 31*a* is 18 mm. On top of the base layer 31*a*, an elastic layer 31*b* made of silicone rubber and a release layer 31*c* which is made of PFA are used. Thicknesses of the elastic layer 31*b* and the release layers 31*c* are 190 μm and 15 μm, respectively. Grease is applied to an inner surface of the film 31 in order to reduce a frictional force between the nip forming member 32 and the heater 34, and the film 31 which is generated by the rotation of the film 31.

The nip forming member 32 guides the film 31 from an inside of the film 31 and, in addition, it serves to form the fixing nip portion N with the pressing roller 33 via the film 31. The nip forming member 32 is a rigid, heat resistant, and heat insulating member, and is formed of liquid crystalline polymer, etc. The film 31 is externally fitted against the nip forming member 32. The pressing roller 33, which is a second rotator, is a roller as a pressing rotator. The pressing roller 33 is configured of a core metal 33*a*, an elastic layer 33*b* and a release layer 33*c*. An outer diameter of the pressing roller 33 is 20 mm, a thickness of the elastic layer 33*b* is 3.5 mm, and a thickness of the release layer 33*c* is 40 μm. The pressing roller 33 is rotatably held at both ends and is rotatably driven by the fixing driving portion 400 (see FIG. 2). Further, the film 31 is rotationally driven by the rotation of the pressing roller 33. The heater 34, which is a heating member, is held by the nip forming member 32 and contacts the inner surface of the film 31. A board 34*a*, a heating member 34*b*, a protective glass layer 34*e* and a fixing temperature sensor 39 will be described below.

The heater 34 will be described in detail in part (a) of FIG. 4 and part (b) of FIG. 4. The heater 34 is configured of the board 34*a*, the heating member 34*b*, a conductor 34*c*, two contacts 34*d*1 and 34*d*2, and a protective glass layer 34*e*. The conductor 34*c* and the heating member 34*b* are electrically connected between the two contact 34*d*1 and the contact 34*d*2, and the heating member 34*b* generates heat by applying an AC voltage via an interactive thyristor (hereinafter referred to as a triac) (not shown).

The board 34*a* is made of alumina ($Al_2O_3$) which is a ceramic. Alumina ($Al_2O_3$), aluminum nitride (AlN), zirconia ($ZrO_2$), silicon carbide (SiC), etc. are widely known as ceramic boards. Among these, alumina ($Al_2O_3$) is inexpensive and industrially readily available. Further, metal with superior strength may be used for the board 34*a*, and stainless steel (SUS) is suitably used as a metal board because of its superior price and strength. Even in a case that either a ceramic board or a metal board is used as the board 34*a*, an insulating layer may be provided when the board is conductive. A protective glass layer 34*e* is formed to ensure insulation between the heating member 34*b* and the film 31. A length of the heating member 34*b* is L=222 mm. An electric resistance between the two contact 34*d*1 and the contact 34*d*2 is 13Ω.

The fixing temperature sensor 39 as a second temperature detecting element is a thermistor. A configuration of the thermistor will be described with reference to part (a) of FIG. 4. The fixing temperature sensor 39 which is a second detecting means is configured of a thermistor element 39*a*, a holder 39*b*, a ceramic paper 39*c* and an insulating resin sheet 39*d*. The ceramic paper 39*c* serves to inhibit heat conduction between the holder 39*b* and the thermistor element 39*a*. The insulating resin sheet 39*d* serves to protect the thermistor element 39*a* physically and electrically. The thermistor element 39*a* is a temperature detecting means in which output value changes according to the temperature of the heater 34, and is connected to the CPU 155 by a Dumet wire (not shown) and wiring. The thermistor element 39*a* detects the temperature of the heater 34 and outputs the detection result to the CPU 155.

The fixing temperature sensor 39 is positioned on an opposite side of the protective glass layer 34*e* with respect to the board 34*a*, is provided in a center with respect to the longitudinal direction of the heating member 34*b*, and contacts the board 34*a*. The CPU 155 controls a temperature in a fixing process based on a detecting result of the fixing temperature sensor 39. The configuration of the fixing temperature sensor 39 is described above.

Operation of the Fixing Device

An operation of the fixing device 30 will be described below. When the control portion 200 receives the image signal, the image forming operation starts and the operation of the fixing device 30 starts. Upon receiving the image signal, the fixing driving portion 400 starts rotating and the pressing roller 33 is rotated (pre rotation operation). Power is supplied to the heating member 34*b* of the heater 34 as the pressing roller 33 rotates, and the power which is supplied to the heating member 34*b* is adjusted so that the detected temperature (notification temperature) of the thermistor element 39*a* becomes a desired value. When the fixing device 30 is sufficiently heated in the pre rotation, the recording material P is conveyed to the fixing nip portion N and fixing operation is performed. The pre rotation operation is an operation until the temperature of the heating member 34*b* reaches the control temperature and the unfixed toner can be fixed to the recording material P. After the recording portion P passes through the fixing nip portion N, the power supply to the heater 34 is completed and the fixing driving portion 400 is stopped (post rotation).

Here, the control temperature of the fixing temperature sensor 39 during the fixing operation is determined in advance according to a type of the recording material P which is printed and the temperature of the environment in which the image forming apparatus 100 is mounted. Temperature and humidity information of the mounting environment of the image forming apparatus 100 is obtained from respective detecting results of the temperature sensor 301 and the humidity sensor 302 which are connected to the image forming apparatus 100.

By the way, in a configuration of detecting temperatures inside and outside the image forming apparatus and detecting an occurrence of a dew condensation in the apparatus based on the difference between them, in a case that there is outside air flowing into the image forming apparatus from a fixing discharge portion, a dew condensation may occur in the apparatus and a decrease in image quality may be occurred. A case in which outside air flows into the apparatus is, for example, wind from an air conditioning facility. Wind from so-called an air blower such as a fan and a circulator which are mounted for indoor air circulation, a ceiling fan which is mounted on a ceiling and an air conditioner, may hit a discharging port of the image forming apparatus, and outside air may flow into the apparatus through the discharging port.

In an image forming apparatus, which fixes the toner image by heating and pressing the recording material in which the toner image is formed, moisture which is absorbed by the recording material is released from the recording material during the fixing process. The atmosphere around the fixing device is high in temperature and saturated water vapor pressure due to heat which is generated by the fixing device so much of the moisture which is generated from the recording material is absorbed into the atmosphere. The air which includes much moisture may enter into the apparatus, without discharging out of the apparatus since it is pushed by outside air which comes from the discharging port. When relatively hot air, which contains a lot of moisture around the fixing device, decreases in temperature in the apparatus and reaches a temperature below a dew point, the dew condensation may occur in the apparatus. Since the dew condensation in the apparatus which occurs as described above is caused by the moisture which is generated by the recording material as it goes through the fixing process, it occurs regardless of whether there is a temperature difference between the inside and the outside of the apparatus. That is, unlike the dew condensation caused by temperature differences between the inside and the outside of the apparatus, it is difficult to predict the occurrence of the dew condensation from the temperatures inside and outside of the apparatus. In particular, when a surface of the photosensitive drum provides a dew condensation, an electric resistance of the surface of the photosensitive drum becomes low due to the condensed moisture, so an electric potential of the photosensitive drum becomes higher than normal (absolute value is larger) by supplying an excessive electric current during charging. As a result, it is not possible to form an electrostatic latent image properly by laser exposure, and an image defect which reduces image density (hereinafter referred to as "thin density") may be occurred. Furthermore, as the dew condensation progresses, an image defect (hereinafter referred to as "fogging"), in which toner on the developing roller transfers to the photosensitive drum by the condensed moisture, may be caused.

Feature of the First Embodiment

A feature of the first embodiment is that the control portion 200 determines whether the image forming apparatus 100 is mounted in an environment where the dew condensation is likely to occur based on the detected temperature of the fixing temperature sensor 39. In a case that the image forming apparatus 100 is mounted in the environment where the dew condensation is likely to occur, the control portion 200 performs an operation to suppress the occurrence of the image defect due to the dew condensation. It will be described in detail below.

As described above, when a printing operation is executed in an environment where outside air blows into the image forming apparatus 100, the dew condensation may be occurred inside the apparatus due to an inflow of the outside air. A case in which outside air flows into the apparatus is, for example, wind from an air conditioning facility. Wind from so-called an air blower such as a fan and a circulator which are mounted for indoor air circulation, a ceiling fan which is mounted on a ceiling and an air conditioner, may hit a discharging port 60 (see FIG. 1) of the image forming apparatus 100, and outside air may flow into the apparatus through the discharging port 60.

In an image forming apparatus 100 which is provided with the fixing device 30 which fixes the toner image T by heating and pressing the recording material P in which the toner image T is formed, moisture which is absorbed by the recording material P is released from the recording material P during the fixing process. The atmosphere around a fixing member is high in temperature and saturated water vapor pressure due to heat which is generated by the fixing member so much of the moisture which is generated from the recording material P is absorbed into the atmosphere.

The air which includes much moisture may enter into the apparatus, without discharging out of the apparatus since it is pushed by outside air which comes from the discharging port 60. When relatively hot air, which contains a lot of moisture around the fixing device 30, decreases in temperature in the apparatus and reaches a temperature below a dew point, the dew condensation may occur in the apparatus.

In particular, when a surface of the photosensitive drum 1 provides the dew condensation, an electric resistance of the surface of the photosensitive drum 1 becomes low due to the condensed moisture. In such a condition, an electric potential of the photosensitive drum 1 becomes higher than normal by supplying an excessive electric current to the photosensitive drum 1 in a charging process during charging. As a result, it is not possible to form an electrostatic latent image properly by laser exposure, and an image defect which reduces image density (hereinafter referred to as "thin density") may be occurred. Furthermore, as the dew condensation of the photosensitive drum 1 progresses, an image defect (hereinafter referred to as "fogging"), in which toner on the developing roller 41 transfers to the photosensitive drum 1 by the condensed moisture, may be caused.

In the following, a detection operation of an outside air inflow environment according to the first embodiment, which detects an inflow of the outside air, will be described. In the first embodiment, the control portion 200 determines whether the image forming apparatus 100 is mounted in an environment where outside air flows in through the discharging port 60, based on the detected temperature of the fixing temperature sensor 39 in the fixing device 30 and a threshold temperature based on the detected temperature (notification temperature) of the environmental temperature sensor 301.

Dew Condensation Environment Detection Operation

A dew condensation environment detection operation according to the first embodiment will be described by using FIG. 5 though FIG. 7. FIG. 5 is a flowchart when performing the dew condensation environment detection operation according to the first embodiment. FIG. 6 is a view showing a state in which the image forming apparatus 100 is set up. FIG. 7 is a graph illustrating the dew condensation environment detection operation according to the first embodiment. When the power of the image forming apparatus 100 is turned on, the control portion 200 starts the step (hereinafter referred to as S) 501 and thereafter. In S501, the control portion 200 starts an initial process in order to change the imaging apparatus 100 into a ready state. In S502, the control portion 200 determines whether or not an abnormality occurs during an initial process. In S502, in a case that the control portion 200 determines that abnormality does not occur, a process proceeds to S503, and in a case that the control portion 200 determines that abnormality occurs, a process proceeds to S507.

In S503, the control portion 200 executes the dew condensation environment detection operation to detect a mounting environment of the image forming apparatus 100. In the dew condensation environment detection operation, the control portion 200 executes temperature control so that the detected temperature of the fixing temperature sensor 39 becomes a predetermined temperature, for example, 150° C. (control temperature, target temperature), synchronized with start of rotational driving of the fixing driving portion 400. In the first embodiment, the control portion 200 terminates the power supply to the heater 34 after rotation with heating for 10 seconds, and performs an operation which continues rotational driving of the pressing roller 33 for 20 seconds. The control portion 200 performs temperature detection by the fixing temperature sensor 39 20 seconds after terminating the power supply to the heater 34, stores the detected temperature by the fixing temperature sensor 39 in the memory 154 (RAM), and terminates the rotation of the pressing roller 33.

In S504, the control portion 200 determines whether or not an environment in which the image forming apparatus 100 is mounted is a condensing environment based on information which is obtained in the condensing environment detection operation which is executed in S503. The condensing environment is an environment in which it is likely to occur the dew condensation, which is caused by moisture which is generated through the fixing process.

Here, the control portion 200 compares the detected temperature of the fixing temperature sensor 39 which is measured in the dew condensation environment detection operation with temperature which is recorded in the memory 154 in advance (dew condensation environment threshold temperature). In a case that the detected temperature by the fixing temperature sensor 39 which is measured in the dew condensation environment detection operation is lower than the dew condensation environment threshold temperature, the control portion 200 determines that the fixing member is cooled by an inflow of the outside air through the discharging port 60. That is, the control portion 200 determines that the image forming apparatus 100 is in the dew condensation environment.

In a configuration of the first embodiment, the fixing temperature sensor 39 for controlling the fixing temperature is arranged on the back of the heater 34. The film 31 and the pressing roller 33 are directly cooled by being exposed to the outside air which flows in through the discharging port 60. As in the first embodiment, in a case that the fixing temperature sensor 39 is thermally distant from the fixing members to be cooled, the pressing roller 33 is driven after the heating is finished so that a part of the film 31 and a part of the pressing roller 33 which are cooled by the outside air plunge into the fixing nip portion N. In this way, it is possible to increase detection sensitivity by the fixing temperature sensor 39. The dew condensation environment threshold temperature is determined from the table which is stored in the memory 154 in advance based on the mounting environment of the image forming apparatus 100 which is detected by the environmental temperature sensor 301.

In S504, the control portion 200 proceeds the process to S506 in a case that it determines that it is in a mounting environment that the outside air flows in through the discharging port 60, that is, in the dew condensation environment. In S506, the control portion 200 executes an operation to reduce the dew condensation (dew condensation reduction operation (dew condensation removal operation)) and proceeds to S505, since an image defect may occur due to the dew condensation in the image forming apparatus 100.

In the first embodiment, control of the cooling fan 303 is changed as an action to reduce the dew condensation inside the image forming apparatus 100. Specifically, airflow rate of the cooling fan 303 is increased and the cooling fan 303 is driven continuously after the print operation is completed. The cooling fan 303 is driven for a predetermined period of time, for example 5 minutes, after the image forming operation is completed. In a case that the outside air is flowing into the image forming apparatus 100 through the discharging port 60, by increasing the airflow of the cooling fan 303, pressure inside the image forming apparatus 100 is increased, so it is possible to reduce the amount of the outside air which enters into the image forming apparatus 100. Furthermore, it is possible to dry the dew condensation inside the image forming apparatus 100 by the outside air sucked by the cooling fan 303.

In a case that the control portion 200 determines that it is not the dew condensation environment in S504, it proceeds a process to S505 and it switches to a print ready and terminates the process in S505. In S507, the control portion 200 stops the operation of the image forming apparatus 100 and terminates the process.

About the Dew Condensation Environment Threshold Temperature

The control portion 200 controls the heater 34 for a first time period (for example, 10 seconds) to become the control temperature, while the image forming apparatus 100 is mounted in a predetermined room temperature environment (for example 15° C.). After that, the control portion 200 stops supplying power to the heater 34 and rotates the pressing roller 33 for a second time period (for example, 20 seconds). In the first embodiment, a profile of a predicted temperature of the fixing member, that is, a predicted temperature decrease curve of the fixing member, is determined in advance when the operations which are described above are performed at plurality of room temperatures. The temperature decrease curve may be obtained by experiments or simulations. And at a timing when temperature is detected by the fixing temperature sensor 39 (t13 which will be described below), temperature which is predicted by the temperature decrease curve is set as the dew condensation environment threshold temperature, and the room temperatures and the dew condensation environment threshold temperatures are correlated and stored as a table in the memory 154. The control portion 200 refers to the table which is stored in the memory 154 and obtains the dew condensation environment threshold temperature based on the detected temperature by the environmental temperature sensor 301. For example, based on the room temperature of 15° C. which is the detected result by the environmental temperature sensor 301, the control portion 200 obtains the dew condensation environment threshold temperature, for example, 73° C. which is correlated with the room temperature of 15° C., from the table in the memory 154. Incidentally, a calculation formula for determining the dew condensation environment threshold temperature from the room temperature may be stored in the memory 154.

In this way, after the heating operation of the fixing device 30 is terminated, the control portion 200 compares a first temperature (a dew condensation environment threshold temperature) which is estimated based on the detecting result by the environmental temperature sensor 301 and a second temperature based on the detecting result by the fixing temperature sensor 39. The control portion 200 executes the dew condensation removal operation which removes the dew condensation inside the image forming apparatus 100 when the second temperature is lower than the first temperature. The fixing temperature sensor may only detect temperature of either the heater 34, the film 31, or the pressing roller 33 and the fixing temperature sensor 39 according to the first embodiment detects the temperature of the heater 34. In the first embodiment, the control portion 200 rotationally drives the pressing roller 33 at timing of detecting the second temperature when comparing the temperatures as described above.

Effect of the First Embodiment

An effect of the first embodiment 1 will be described by using a comparative example. As the comparative example, an image forming apparatus, which does not predict the mounting environment by inflow of the outside air by using the fixing temperature sensor 39 of the fixing device 30 which is a feature of the first embodiment, is used. Other configurations of the image forming apparatus and various settings are the same as in the first embodiment. Verification of the effect is performed at atmosphere environment temperature and humidity of 15° C. and 80%.

FIG. 6 is a view illustrating an environment in which the image forming apparatuses according to the first embodiment and the comparative example in the verification are mounted. An air blower 312 is mounted on a ceiling 310 above the image forming apparatus 100. The air blower 312 generates a wind 314. Assuming the mounting environment in which the wind 314 from the air blower 312 blows on the image forming apparatus 100, the air blower 312 is mounted on an upper side of the image forming apparatus 100 with respect to a vertical direction, and printing is performed while the air is blowing. Wind speed of the wind 314 which is measured directly above the image forming apparatus 100 is 2.0 mm/s. Wind speed was measured with testo 435 multifunction environment measuring instrument manufactured by Testo.

The detected result of the dew condensation environment detection operation according to the first embodiment by using FIG. 7. The detected result of the dew condensation will be described along with a result when the air is not blowing. Time (seconds) is shown in a horizontal axis and temperature (° C.) is shown in a vertical axis in FIG. 7. t11 is a timing when rotation of the pressing roller 33 starts and power is supplied to the heater 34. The heater 34 is controlled to reach the control temperature (150° C.). t12 is a timing when the power supply to the heater 34 is terminated. The first time period from a timing t11 to the timing t12 is 10 seconds. t13 is a timing when the rotation of the pressing roller 33 is stopped and a value which is detected by the fixing temperature sensor 39 is recorded in the memory 154. The second time period from the timing t12 to the timing t13 is 20 seconds. Furthermore, a two dot chain line indicates the dew condensation environment threshold temperature (73° C.) which is used for determination in S504 in FIG. 5. Incidentally, the value of the dew condensation environment threshold temperature which is 73° C. is a value at the timing t13 of the temperature decrease curve which is described above at the environmental temperature of 15° C.

A solid line L1 in FIG. 7 is a profile of the detected temperature of the fixing temperature sensor 39 in the dew condensation environment detection operation in a case that the air is blowing from the air blower 312 which is mounted above the image forming apparatus 100. A dotted line L2 in FIG. 7 is a profile of the detected temperature by the fixing temperature sensor 39 in the dew condensation environment detection operation which is performed when the air is not blowing from the air blower 312 which is mounted above the image forming apparatus 100.

Comparing the solid line L1 with the dotted line L2, there is almost no difference in the detected temperature of the fixing temperature sensor 39 until the timing t12 when the power supply to the heater 34 is terminated. On the other hand, when the power supply to the heater 34 is stopped at the timing t12, both of the detected temperatures by the fixing temperature sensor 39 diverge, and the detected temperature of the fixing temperature sensor 39 is lower when the air is blowing than when the air is not blowing. In the solid line L1, the detected temperature by the fixing temperature sensor 39 at the timing t13 which is 20 seconds after the timing t12 when the power supply to the heater 34 is stopped, is 67° C.

Here, in the first embodiment, the fixing temperature sensor 39 is arranged behind the heater 34 and in the fixing nip portion N. The outside air flows into the image forming apparatus 100 from the discharging port 60 and temperature change in which the inflow outside air cools the fixing member is detected, the control portion 200 continues to rotationally drive the pressing roller 33 by the fixing driving portion 400 after the timing t12. In this way, a surface of the fixing member which is cooled by the outside air is conveyed into the fixing nip portion N.

The dew condensation environment threshold temperature, which is based on the detected temperature by the environmental temperature sensor 301 in an environment of 15° C., is 73° C., and the detected temperature of 67° C. by the fixing temperature sensor 39 at the timing t13 is below the dew condensation environment threshold temperature of 73° C. The fixing member is cooled by wind which flows into through the discharging port 60 and it is shown that it is possible to detect, that the fixing member is cooled, by the fixing temperature sensor 39 which contacts a back surface of the heater 34.

That is, the image forming apparatus 100 which is shown in FIG. 7 is expected to be in a mounting environment in which the dew condensation may occur in the image forming apparatus 100 due to water vapor which is generated in the fixing process by the wind which flows into through the discharging port 60. Therefore, the image forming apparatus 100 according to the first embodiment executes the dew condensation reduction operation in S506 in FIG. 5 to reduce the occurrence of the image defect due to the dew condensation in the apparatus.

Effect of the First Embodiment

Next, FIG. 8 illustrates the dew condensation reduction effect by executing the dew condensation reduction operation based on the dew condensation environment detection result in the first embodiment. FIG. 8 shows a result of checking a generation level of an image defect (thin density) which is caused by the dew condensation in the image forming apparatus 100 when a total of 30 sheets are printed with an intermittent time of 60 seconds for 10 consecutive prints by using the first embodiment and the comparison example.

The recording material P which is used for printing is Xerox's Vitality paper with a basis weight of 75 g/m2. The recording material P which is used for verification is left in an environment with a temperature and humidity of 15° C. and 80% for 72 hours and it is sufficiently moisture absorbed. Moisture content of the recording material P which is used for printing is around 9%. The moisture content of the recording material P is measured by using Moistrex MX8000 which is manufactured by NDC Technologies. The printed image is a horizontal strip of halftone with 50% image density of Y, M, C, and K. "O" in FIG. 8 indicates that no unacceptable halftone image density reduction is occurred, while "X" indicates that an unacceptable level of halftone density reduction is occurred.

In the configuration of the first embodiment as shown in part (a) of FIG. 8, in which the control of the cooling fan 303 is changed as the dew condensation reduction operation, no image defects (thin density), which is caused by the dew condensation in the image forming apparatus 100, are occurred during printing of all 30 sheets. On the other hand, the comparative example as shown in part (b) of FIG. 8 in which the dew condensation reduction operation is not performed, the density reduction is occurred in the halftone after 18th sheets.

Reason Why Thin Density is Occurred in the Comparative Example

Here, a mechanism by which halftone density reduction is occurred in the comparative example will be described. Part (a) of FIG. 9 is a graph showing a surface potential Vd of the photosensitive drum 1 after charging (hereinafter, referred to as a drum potential after charging Vd) and a surface potential Vht of the photosensitive drum 1 in a halftone exposure portion with image density 50% (hereinafter, referred to as a halftone portion potential Vht) during printing operation in the first embodiment. Black dots in the figure indicates the charged drum potential Vd, and white dots indicates the halftone portion potential Vht. Further, part (b) of FIG. 9 is a graph showing the surface potential Vd of the drum after charging and the halftone portion potential Vht with image density 50% during printing operation in the comparative example. Incidentally, a horizontal axis of each graph represents the number of printed sheets. A vertical axis (potential (V)) is taken upward in a direction of increasing absolute value. In a following description, terms such as increase or large will be used with respect to absolute value.

First of all, part (a) of FIG. 9 will be described. The drum potential after charging Vd of a first sheet of printing is −500V as set above, and the halftone portion potential Vht is about −200V on average. After 10 sheets of consecutive printing, both the drum potential after charging Vd and the halftone portion potential Vht are increased slightly. This is because moisture, which is generated in the fixing process during consecutive printing of 10 sheets, entered the image forming apparatus 100 by the outside air which flows in through the discharging port 60, and electrical resistance is reduced when slight moisture from the dew condensation is adhered to the surface of the photosensitive drum 1.

As a result, since potential difference between the developing roller potential Vdc and the halftone portion potential Vht become small, halftone density is slightly reduced in a latter half of the printing, however, the halftone density is not reduced to an unacceptable level in the configuration of the first embodiment. Further, in a case that the dew condensation is dried during 60 second intermittent and 10 sheets of consecutive printing (11-20 sheets) after 60 second intermittent, it is similar potential change to the first 10 sheets of consecutive printing. Next 10 sheets of consecutive printing (21-30 sheets) are also similar.

Next, a potential change in the comparative example will be described by using part (b) of FIG. 9. The drum potential after charging Vd of the first sheet of printing is −500V as set above, and the halftone portion potential Vht is about −200V on average. After 10 sheets of consecutive printing, both the drum potential after charging Vd and the halftone portion potential Vht is increased significantly compared to the configuration of the first embodiment. This is due to the following reasons.

This is because an amount of the dew condensation is higher in the comparative example due to more outside air flowing in through the discharging port 60, because air pressure inside the image forming apparatus 100 is lower in the comparative example, compared to the configuration in the first embodiment in which the cooling fan 303 which is an intake fan is controlled as the dew condensation reduction operation based on the result of the dew condensation environment detection operation. Furthermore, in the configuration of the comparative example, potential does not return to an initial potential even after 10 sheets of consecutive printing after 60 second intermittent time, and the potential is increased furthermore along with the number of sheets. Specifically, both the drum potential after charging Vd and the halftone portion potential Vht is increased more in 20th sheets of printing than in 10th sheets of printing, and even more in the 30th sheets of printing than in the 20th sheets of printing. Therefore, in printing after intermittent, thin density is occurred in an earlier phase.

As described above, in the first embodiment, the control portion 200 compares the detected temperature by the fixing temperature sensor 39 in the fixing device 30 with the dew condensation environment threshold temperature which is determined in advance based on the detected temperature by the environmental temperature sensor 301. The control portion 200 determines that the image forming apparatus 100 is mounted in the environment where outside air flows in through the discharging port 60 in a case that the detected temperature by the fixing temperature sensor 39 is lower than the dew condensation environment threshold temperature. In a case that it is determined that the image forming apparatus 100 is mounted in the environment where the outside air flows in, the dew condensation may occur in the image forming apparatus 100 due to water vapor which is generated by the recording material during the fixing process. In such cases, the control portion 200 executes the dew condensation reduction operation to suppress the image defect which is caused by the dew condensation in the image forming apparatus 100.

In the first embodiment, as the dew condensation reduction operation, the control of the cooling fan 303 which is mounted on the image forming apparatus 100 is changed. Specifically, the control portion 200 increases an intake air amount of the cooling fan 303 and/or extends driving time of the cooling fan 303. Therefore, it is possible to suppress the inflow of the outside air through the discharging port 60 by increasing the pressure in the image forming apparatus 100 and to reduce the occurrence of the image defect which is caused by the dew condensation in the apparatus by accelerating drying of the dew condensation which occurs in the image forming apparatus 100.

Further, in the first embodiment, changing of the control of the cooling fan 303 as the dew condensation reduction action in a case that it is determined that the apparatus is mounted in the dew condensation environment is described as an example. The dew condensation reduction operation is not limited to this, however, it may be configured, for example, to provide time to reduce the moisture in the image forming apparatus 100 by extending time of the pre rotation and the post rotation. Alternatively, rather than reducing the dew condensation itself, it may be configured to perform image forming under a condition which is less likely to cause a reduction in image density by, for example, adjusting a latent image setting (charging voltage, exposure light intensity, developing voltage, etc.) during image formation. For example, the charging voltage may be controlled so that the drum potential after charging Vd is lower than in a case in which the dew condensation reduction operation is not performed.

In this way, the control portion 200 executes the dew condensation removal operation by operating the cooling fan 303. The dew condensation removal operation may include an operation to extend the time until the fixing device 30 is ready for the fixing process (pre rotation operation) and an operation to extend the time until the apparatus enters the sleep state (post rotation operation). Furthermore, the dew condensation removal operation may include an operation to control the charging voltage which applied to the charging roller, an operation to control the light intensity of the light source of the exposure unit 3 and an operation to control the developing voltage which is applied to the developing roller 41.

As described above, according to the first embodiment, it is possible to suppress the occurrence of the image defect due to the dew condensation which is caused by moisture which is generated through the fixing process.

Second Embodiment

In the second embodiment, a mounting configuration of the fixing temperature sensor 59, which differs from that of the first embodiment, will be described. A configuration of the image forming apparatus which is applied in the second embodiment is similar to the first embodiment, and the same reference numerals will be used for the same members, and descriptions will be omitted.

Fixing Device

A configuration of the fixing device 50 according to the second embodiment will be described by using FIG. 10. FIG. 10 is a sectional schematic view of the fixing device 50. The fixing device 50 according to the second embodiment is configured of the cylindrical film 31, the nip forming member 32 which holds the film 31, the pressing roller 33 which forms the fixing nip portion N together with the film 31, and the heater 34 for heating the recording material P. The film 31, the nip forming member 32, the pressing roller 33 and the heater 34 are the same as in the first embodiment. On an inner surface of the film 31, the fixing temperature sensor 59 as the second detecting means is arranged so that the fixing temperature sensor 59 contacts the inner surface of the film 31 on the side of the heater 34.

The fixing temperature sensor 59 is a thermistor. The configuration of the thermistor will be described with reference to FIG. 11. The fixing temperature sensor 59 which is the second detecting means is configured of a thermistor element **59*a*, a holder 59*b*, a plate spring 59*c* which also serves as a conductor wire and an insulating resin sheet 59*d*. The plate spring 59*c* is a conducting wire for measuring the voltage at both ends of the thermistor element 59*a* and serves to press the thermistor element 59*a* against the inner surface of the film 31. The insulating resin sheet 59*d* serves to physically and electrically protect the thermistor element 59*a*. The thermistor element 59*a* is a temperature detecting means in which output value changes according to the temperature of the heater 34, and is connected to the CPU 155 by the plate spring 59*c* and a wire. The thermistor element 59*a* detects the temperature of the inner surface of the film 31 and outputs the detection result to the CPU 155**.

The fixing temperature sensor 59 is arranged in the nip forming member 32 and is arranged to contact the inner surface of the film 31 at a position on a downstream side of the fixing nip portion N with respect to a rotational direction of the film 31. The fixing temperature sensor 59 is arranged along a forward direction of the rotational direction of the film 31. At a position in which the fixing temperature sensor 59 is inscribed in the film 31 is at a substantially center of the film 31 with respect to the longitudinal direction of the film 31. The CPU 155 controls the temperature of the fixing process based on the detected result by the fixing temperature sensor 59. What is described above is a description of the configuration of the fixing temperature sensor 59 which includes the thermistor element **59*a***.

Operation of the Fixing Device 50

In the second embodiment, the control portion 200 performs a fixing temperature control based on the temperature of the back side of the film 31 which is detected by the fixing temperature sensor 59 which is inscribed in the film 31. The dew condensation environment detection operation according to the second embodiment will be described by using FIG. 12. Incidentally, FIG. 12 is the same graph as FIG. 7. t21 is a timing when the rotation of the pressing roller 33 is started. t22 is a timing when the rotation of the pressing roller 33 is stopped. The first time period from the timing t21 to the timing t22 is 10 seconds. t23 is a timing at which value detected by the fixing temperature sensor 59 is recorded. The second time period from the timing t22 to the timing t23 is 20 seconds. Further, a two dot chain line indicates the dew condensation environment threshold temperature.

When the control portion 200 receives the image signal, the image forming operation is started, and the operation of the fixing device 50 is also started. The control portion 200 starts the rotation of the fixing driving portion 400 and rotates the pressing roller 33 (pre rotation operation). The control portion 200 supplies power to the heating member 34*b* of the heater 34 as the pressing roller 33 rotates, and adjusts the power which is supplied to the heating member 34*b* so that the detected temperature by the fixing temperature sensor 59 becomes desired value. When the fixing device 50 is sufficiently heated in the pre rotation, the recording material P is conveyed to the fixing nip portion N and the fixing operation is performed. After the recording portion P passes through the fixing nip portion N, the control portion 200 terminates the power supply to the heater 34 and stops the fixing driving portion 400 at the timing t22.

Here, the control temperature of the fixing temperature sensor 59 during the fixing operation is determined in advance according to a type of the recording material P which is printed and the temperature of the environment on which the image forming apparatus 100 is mounted. Temperature and humidity information of the mounting environment of the image forming apparatus is obtained from respective detecting results of the temperature sensor 301 and the humidity sensor 302 which are connected to the image forming apparatus 100.

Feature of the Second Embodiment

In the configuration of the second embodiment, unlike the dew condensation environment detection operation in the first embodiment, the rotation of the pressing roller 33 is stopped with the termination of supplying power to the heater 34 at the timing t22 during the dew condensation environment detection operation. In the following, a detection operation of an outside air inflow environment according to the second embodiment, which detects an inflow of the outside air, will be described.

In the second embodiment, the control portion 200 determines whether the image forming apparatus 100 is mounted in the environment where outside air flows in through the discharging port 60, based on the detected temperature by the fixing temperature sensor 59 which contacts the inner surface of the film 31 and the dew condensation threshold temperature based on the detected temperature by the environmental temperature sensor 301. In the second embodiment, the fixing temperature sensor 59 detects the temperature of the film 31. The fixing temperature sensor 59 is arranged on a downstream side of the film 31 with respect to the rotational direction of the film 31.

In an initial process to change the image forming apparatus 100 to the ready state, the control portion 200 executes the dew condensation environment detection operation to detect the mounting environment of the image forming apparatus 100. The control portion 200 executes a temperature adjustment control so that the detected temperature by the fixing temperature sensor 59 becomes 130° C. (control temperature) synchronously with the start of the rotational driving of the fixing driving portion 400. In the second embodiment, after 10 seconds of rotation with heating, the power supply to the heater 34 is terminated and the rotational driving of the pressing roller 33 is stopped (timing t22). At the timing t23 which is 20 seconds after the timing t22 when the fixing driving portion 400 is stopped, the control portion 200 stores the detected temperature by the fixing temperature sensor 59 in the memory 154 (RAM).

The control portion 200 compares the temperature of the fixing temperature sensor 59 which is measured in the condensation environment detection operation with the dew condensation environment threshold temperature based on the temperature decrease curve which is recorded in the memory 154 in advance. In a case that the detected temperature by the fixing temperature sensor 59 which is measured in the dew condensation environment detection operation is lower than the dew condensation environment threshold temperature, the control portion 200 determines that the film 31 is cooled by the inflow of the outside air through the discharging port 60. That is, the control portion 200 determines that the image forming apparatus 100 is in the dew condensation environment.

In the configuration of the first embodiment, the fixing temperature sensor 39 is arranged behind the heater 34 and is in the fixing nip portion N. Since the outside air flows into the image forming apparatus 100 through the discharging port 60 and cools the fixing member and temperature change is detected, the fixing driving portion 400 is rotationally driven and the surface of the fixing member which cooled by the outside air is conveyed into the fixing nip portion N in the first embodiment.

In the configuration of the second embodiment, the fixing temperature sensor 59 directly measures the temperature of the fixing film 31 which is the fixing member. Therefore, it is possible to detect the temperature change of the fixing member due to the inflow of the outside air without rotationally driving the fixing driving portion 400. In the second embodiment, the fixing temperature sensor 59 is arranged on a downstream side of the film 31 with respect to the rotational direction of the film 31, so it is closer to the discharging port 60. Since it is cooled by the outside air which flows into more directly, it is possible to detect the inflow of the outside air.

In the second embodiment, it is described by using the configuration in which the fixing temperature sensor 59 for controlling the temperature of the fixing member contacts the inner surface of the film 31. However, a temperature measurement position of the film 31 is not limited to this, and for example, even in a case of a configuration of measuring the temperature of the surface of the film 31, it is similar. Further, a temperature sensor for the dew condensation environment detection operation is not limited to the film 31, however, it may be configured to measure the temperature of the pressing roller 33 which opposes the film 31. On the other hand, as described in the second embodiment, it is possible to detect more accurately since it is easily cooled by the outside air when the temperature change of a member with low heat capacity such as film 31 is used to measure the temperature decrease of the fixing member.

Further, in the second embodiment, a configuration in which the dew condensation environment detection operation is performed by using the fixing temperature sensor 59 which controls the temperature of the fixing member is described as an example, however, the dew condensation environment detection operation may be performed by using a temperature sensor which measures the temperature of the fixing member, which is different from the temperature sensor which controls the temperature.

As described above, according to the second embodiment, it is possible to suppress the occurrence of the image defect due to the dew condensation which is caused by moisture which is generated through the fixing process.

Other Embodiment

In the first embodiment and the second embodiment, the dew condensation environment detection operation is performed during heating and rotating operation of the fixing device which is not accompanied by a conveying operation which is different from the fixing process to the recording material P, however, it is not limited to this. For example, the temperature of the fixing member may be measured during a heat release process after the fixing process to the recording material P is terminated, and the operation of the dew condensation environment detection may be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-210098 filed on Dec. 13, 2023, which is hereby incorporated by reference herein in its entirety.

What is claimed is:

1. An image forming apparatus for forming an image on a recording material, the image forming apparatus comprising:

a first temperature detector that detects a temperature of an environment where the image forming apparatus is installed;

a fixing unit configured to fix a toner image formed on the recording material by heating and pressurizing;

a second temperature detector that detects a temperature of the fixing unit; and a control unit configured to control the fixing unit based on a detecting result of the second unit temperature detector, wherein the control unit performs comparison of a first temperature estimated based on a detecting result of the first temperature detector and a second temperature based on the detecting result of the second temperature detector after completion of a heating operation of the fixing unit and executes a dew condensation removal operation in which dew condensation in the image forming apparatus is removed in a case in which the second temperature is lower than the first temperature, wherein the fixing unit includes a heating member, a first rotatable member in contact with the heating member and heated by the heating member, and a second rotatable member configured to form a nip portion with the first rotatable member, and wherein the second temperature detector detects the temperature of any of the heating member, the first rotatable member, and the second rotatable member.

2. The image forming apparatus according to claim 1, wherein the control unit rotates the second rotatable member from the completion of the heating operation of the fixing unit until the second temperature is detected in performing the comparison.

3. The image forming apparatus according to claim 2, wherein the second temperature detector detects the temperature of the heating member.

4. The image forming apparatus according to claim 1, wherein the second temperature detector detects the temperature of the first rotatable member.

5. The image forming apparatus according to claim 4, wherein the second temperature detector is disposed on a downstream side of the nip portion in a rotational direction of the first rotatable member.

6. The image forming apparatus according to claim 1, further comprising a cooling member configured to suck an outside air and cool the fixing unit, wherein the control unit performs the dew condensation removal operation by operating the cooling member.

* * * * *